US008588465B2

(12) United States Patent
Geiss

(10) Patent No.: US 8,588,465 B2
(45) Date of Patent: Nov. 19, 2013

(54) VISUAL TARGET TRACKING

(75) Inventor: Ryan M. Geiss, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 12/632,599

(22) Filed: Dec. 7, 2009

(65) Prior Publication Data

US 2010/0197395 A1  Aug. 5, 2010

Related U.S. Application Data

(63) Continuation-in-part of application No. 12/363,604, filed on Jan. 30, 2009, now Pat. No. 8,267,781.

(51) Int. Cl.
*G06K 9/00* (2006.01)
(52) U.S. Cl.
USPC ............................ 382/103; 382/106; 382/154
(58) Field of Classification Search
USPC ........... 345/473, 474, 475; 348/169; 382/103; 701/2
See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |
| 4,901,362 | A | 2/1990 | Terzian |

(Continued)

FOREIGN PATENT DOCUMENTS

| CN | 1764931 A | 4/2006 |
| CN | 201254344 B | 6/2010 |

(Continued)

OTHER PUBLICATIONS

Marks, R., "Method and apparatus for real time motion capture," CN1764931A abstract and corresponding WO2004072909A1 abstract.*

(Continued)

*Primary Examiner* — Vikkram Bali
*Assistant Examiner* — Xuemei Chen
(74) *Attorney, Agent, or Firm* — Alleman Hall McCoy Russell & Tuttle LLP

(57) ABSTRACT

A method of tracking a target includes classifying a pixel having a pixel address with one or more pixel cases. The pixel is classified based on one or more observed or synthesized values. An example of an observed value for a pixel address includes an observed depth value obtained from a depth camera. Examples of synthesized values for a pixel address include a synthesized depth value calculated by rasterizing a model of the target; one or more body-part indices estimating a body part corresponding to that pixel address; and one or more player indices estimating a target corresponding to that pixel address. One or more force vectors are calculated for the pixel based on the pixel case, and the force vector is mapped to one or more force-receiving locations of the model representing the target to adjust the model representing the target into an adjusted pose.

20 Claims, 18 Drawing Sheets

(56) References Cited

U.S. PATENT DOCUMENTS

| | | |
|---|---|---|
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,889,524 A | 3/1999 | Sheehan et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,567,536 B2 | 5/2003 | McNitt et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,919,892 B1 * | 7/2005 | Cheiky et al. ............... 345/473 |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,068,815 B2 * | 6/2006 | Chang et al. ............... 382/106 |
| 7,098,891 B1 | 8/2006 | Pryor |
| 7,104,890 B2 | 9/2006 | Tsuda et al. |
| 7,113,918 B1 | 9/2006 | Ahmad et al. |
| 7,116,330 B2 | 10/2006 | Marshall et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 * | 8/2007 | Luck et al. ............... 382/103 |
| 7,259,747 B2 | 8/2007 | Bell |
| 7,263,209 B2 * | 8/2007 | Camus et al. ............... 382/104 |
| 7,274,800 B2 | 9/2007 | Nefian et al. |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,492,367 B2 | 2/2009 | Mahajan et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |

(56) References Cited

U.S. PATENT DOCUMENTS

| | | | |
|---|---|---|---|
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| 7,852,338 B1* | 12/2010 | Baraff | 345/474 |
| 7,864,180 B1* | 1/2011 | Baraff et al. | 345/473 |
| 7,864,181 B1* | 1/2011 | Baraff | 345/475 |
| 7,872,653 B2* | 1/2011 | Zhou et al. | 345/473 |
| RE42,256 E | 3/2011 | Edwards | |
| 7,898,522 B2 | 3/2011 | Hildreth et al. | |
| 7,965,866 B2* | 6/2011 | Wang et al. | 382/103 |
| 7,996,793 B2 | 8/2011 | Latta et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,075,942 B1 | 12/2011 | Muray et al. | |
| 2002/0024517 A1* | 2/2002 | Yamaguchi et al. | 345/424 |
| 2002/0041327 A1 | 4/2002 | Hildreth et al. | |
| 2002/0164067 A1 | 11/2002 | Askey et al. | |
| 2003/0144768 A1* | 7/2003 | Hennion et al. | 701/2 |
| 2004/0155962 A1 | 8/2004 | Marks | |
| 2004/0193413 A1 | 9/2004 | Wilson et al. | |
| 2005/0031166 A1 | 2/2005 | Fujimura et al. | |
| 2005/0215319 A1 | 9/2005 | Rigopulos et al. | |
| 2005/0265583 A1 | 12/2005 | Covell et al. | |
| 2006/0055706 A1 | 3/2006 | Perlman et al. | |
| 2006/0274947 A1 | 12/2006 | Fujimura et al. | |
| 2007/0117625 A1 | 5/2007 | Marks et al. | |
| 2007/0122001 A1 | 5/2007 | Wang et al. | |
| 2007/0159455 A1 | 7/2007 | Lin | |
| 2007/0286456 A1 | 12/2007 | Ariyur et al. | |
| 2007/0298882 A1 | 12/2007 | Marks et al. | |
| 2008/0001951 A1 | 1/2008 | Marks et al. | |
| 2008/0026838 A1 | 1/2008 | Dunstan et al. | |
| 2008/0079721 A1 | 4/2008 | Hsiao et al. | |
| 2008/0106746 A1 | 5/2008 | Shpunt et al. | |
| 2008/0137956 A1 | 6/2008 | Yang et al. | |
| 2008/0152191 A1 | 6/2008 | Fujimura et al. | |
| 2008/0159620 A1 | 7/2008 | Camus et al. | |
| 2008/0170776 A1 | 7/2008 | Albertson et al. | |
| 2008/0212836 A1 | 9/2008 | Fujimura et al. | |
| 2008/0309664 A1 | 12/2008 | Zhou et al. | |
| 2009/0027337 A1 | 1/2009 | Hildreth | |
| 2009/0085864 A1 | 4/2009 | Kutliroff et al. | |
| 2009/0141933 A1 | 6/2009 | Wagg | |
| 2009/0153474 A1 | 6/2009 | Quennesson | |
| 2009/0154796 A1 | 6/2009 | Gupta et al. | |
| 2009/0175540 A1 | 7/2009 | Dariush et al. | |
| 2009/0198354 A1 | 8/2009 | Wilson | |
| 2009/0209343 A1 | 8/2009 | Foxlin et al. | |
| 2009/0221368 A1 | 9/2009 | Yen et al. | |
| 2009/0221374 A1 | 9/2009 | Yen et al. | |
| 2009/0228841 A1 | 9/2009 | Hildreth | |
| 2009/0232353 A1* | 9/2009 | Sundaresan et al. | 382/103 |
| 2009/0244309 A1 | 10/2009 | Maison et al. | |
| 2009/0280901 A1 | 11/2009 | Casparian et al. | |
| 2010/0183192 A1 | 7/2010 | Fritsch et al. | |

FOREIGN PATENT DOCUMENTS

| | | |
|---|---|---|
| EP | 0583061 A2 | 2/1994 |
| EP | 1253558 A2 | 10/2002 |
| JP | H0620055 A | 1/1994 |
| JP | 08044490 A1 | 2/1996 |
| JP | 2002058045 A | 2/2002 |
| JP | 2008537815 A | 9/2008 |
| KR | 1020050099547 A | 10/2005 |
| WO | 93/10708 A1 | 6/1993 |
| WO | 97/17598 A1 | 5/1997 |
| WO | 99/44698 A1 | 9/1999 |
| WO | 2008109567 A2 | 9/2008 |
| WO | 2009086088 A1 | 7/2009 |
| WO | 2010038693 A1 | 4/2010 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

(56) References Cited

OTHER PUBLICATIONS

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

"International Search Report", Mailed Date: Aug. 4, 2011, Application No. PCT/US2010/059094, Filed Date: Dec. 6, 2010, pp. 6.

Carranza et al.; "Free-Viewpoint Video of Human Actors"; retrieved from <http://www.mpi-inf.mpg.de/~theobalt/sig03_preprint.pdf>; ACM SIGGRAPH Conference Proceedings; Jul. 2003, 9 pages.

Drummond et al.; "Real-Time Tracking of Highly Articulated Structures in the Presence of Noisy Measurements"; retrieved from <http://mi.eng.cam.ac.uk/reports/svr-ftp/drummond_iccv2001.pdf>: Jul. 2001, 6 pages.

Geer, David, "Will Gesture-Recognition Technology Point the Way?" Industry Trends, Oct. 2004, <<http://iat.ubalt.edu/courses/old/cosc324.101_Sp06/gesture-recog.pdf>>, Access date: Jun. 23, 2010, 4 pages.

Mikic et al.; "Human Body Model Acquisition and Tracking using Voxel Data"; retrieved from <http://cvrr.ucsd.edu/publications/pdfs/IJCVRevised.pdf>; International Journal of Computer Vision; Jul.-Aug. 2003, 31 pages.

Ning et al.; "Articulated Model based People Tracking using Motion Models"; retreived from <http://www.sinobiometrics.com/publications/hzning/Tracking%20Walker%20Based-on%20Motion20%Model(submitted%20to%20ICMI).pdf>; Oct. 2002, 6 pages.

Noser, Hansrudi et al., "Sensor Based Synthetic Actors in a Tennis Game Simulation," Computer Graphics Laboratory, Swiss Federal Institute of Technology, <<http://ai.stanford.edu/~latombe/cs99k/2000/noser.pdf>>, Access date: Jun. 23, 2010, 24 pages.

Qui, Tran Cong Thien et al., "Magic Land: a 3D Human Capture Mixed Reality System for Museum Experiences,"Mixed Reality Lab, Singapore, <<http://www.idc.ul.ie/museumworkshop/Papers/TranetAl.pdf>>, Access date: Jun. 23, 2010, 8 pages.

Sminchisescu et al.; "Human Pose Estimation from Silhouettes a Consistent Approach using Distance Level Sets"; retreived at <http://perception.inrialpes.fr/Publications/2002/ST02a/wscg.pdf>; Feb. 2002, 9 pages.

Stenger et al; "Model-based 3D Tracking of an Articulated Hand"; retrieved from <http://mi.eng.cam.ac.uk/~bdrs2/papers/stenger_cvpr01.pdf>: Dec. 2001, 6 pages.

ISA Korea, International Search Report and Written Opinion of PCT/US2010/020791, Aug. 2, 2010, WIPO, 8 pages.

"International Search Report", Mailed Date: Jul. 18, 2011, Application No. PCT/US2010/059072, Filed Date: Dec. 6, 2010, pp. 12.

"International Search Report", Mailed Date: Jul. 29, 2011, Application No. PCT/US2010/059064, Filed Date: Dec. 6, 2010, pp. 7.

"International Search Report", Mailed Date: Aug. 4, 2011, Application No. PCT/US2010/059054, Filed Date: Dec. 6, 2010, pp. 6.

"International Search Report", Mailed Date: Jul. 27, 2011, Application No. PCT/US2010/057924, Filed Date: Nov. 24, 2010, pp. 8.

"International Search Report", Mailed Date: Aug. 4, 2011, Application No. PCT/US2010/059087, Filed Date: Dec. 6, 2010, pp. 6.

Intellectual Property Office of China, Office Action of Chinese Patent Application No. 201080055319.4, Jan. 18, 2013, China, 8 pages.

Demirdjian.D,"Enforcing Constraints for Human Body Tracking", Retrieved at <<http://people.csail.mit.edu/demirdji/papers/artic-tracking.pdf>>,Jun. 16-22, 2003,vol. 9, pp. 8.

Gupta,et al.,"Constraint Integration for Multiview Pose Estimation of Humans with Self-Occlusions", Retrieved at <<http://www.cs.umd.edu/~agupta/3dpvt.pdf>>, Jun. 14-16, 2006, pp. 900-907.

Jaeggli, et al.,"Model-based Sparse 3D Reconstruction for Online Body Tracking", Retrieved at <<http://homes.esat.kuleuven.be/~tkoninck/publications/spie_ModelBasedSparseReconstruction.pdf>>, Jan. 2005, vol. 5665,pp. 226-234.

Mikic, et al.,"Human Body Model Acquisition and Motion Capture Using Voxel Data",Retrieved at <<http://www.code.ucsd.edu/~pcosman/amdo.pdf>> Nov. 2002,vol. 2492, pp. 104-118.

Mitchelson, et al.,"Simultaneous Pose Estimation of Multiple People using Multiple-View Cues with Hierarchical Sampling",Retrieved at <<http://www.ee.surrey.ac.uk/CVSSP/VMRG/Publications/mitchelson03bmvc.pdf>>, Sep. 2003, pp. 1-10.

Navaratnam, et al.,"Hierarchical Part-Based Human Body Pose Estimation", Retrieved at http://citeseerx.ist.psu.edu/viewdoc/download?doi=10.1.1.100.9926&rep=rep1%type=pdf, Sep. 5-8, 2005, pp. 1-10.

Poppe, et al.,"Towards Real-time Body Pose Estimation for Presenters in Meeting Environments",Retrieved at <<http://wscg.zcu.cz/wscg2005/Papers_2005/Short/G05-full.pdf>>, Feb. 2005, Proceedings of the International Conference in Central Europe on Computer Graphics, Visualization and Computer Vision 2005 , pp. 1-4.

State Intellectual Property Office of the People's Republic of China, Notice on the Second Office Action of Chinese Patent Application No. 201080055361, Apr. 26, 2013, China, 9 pages.

* cited by examiner

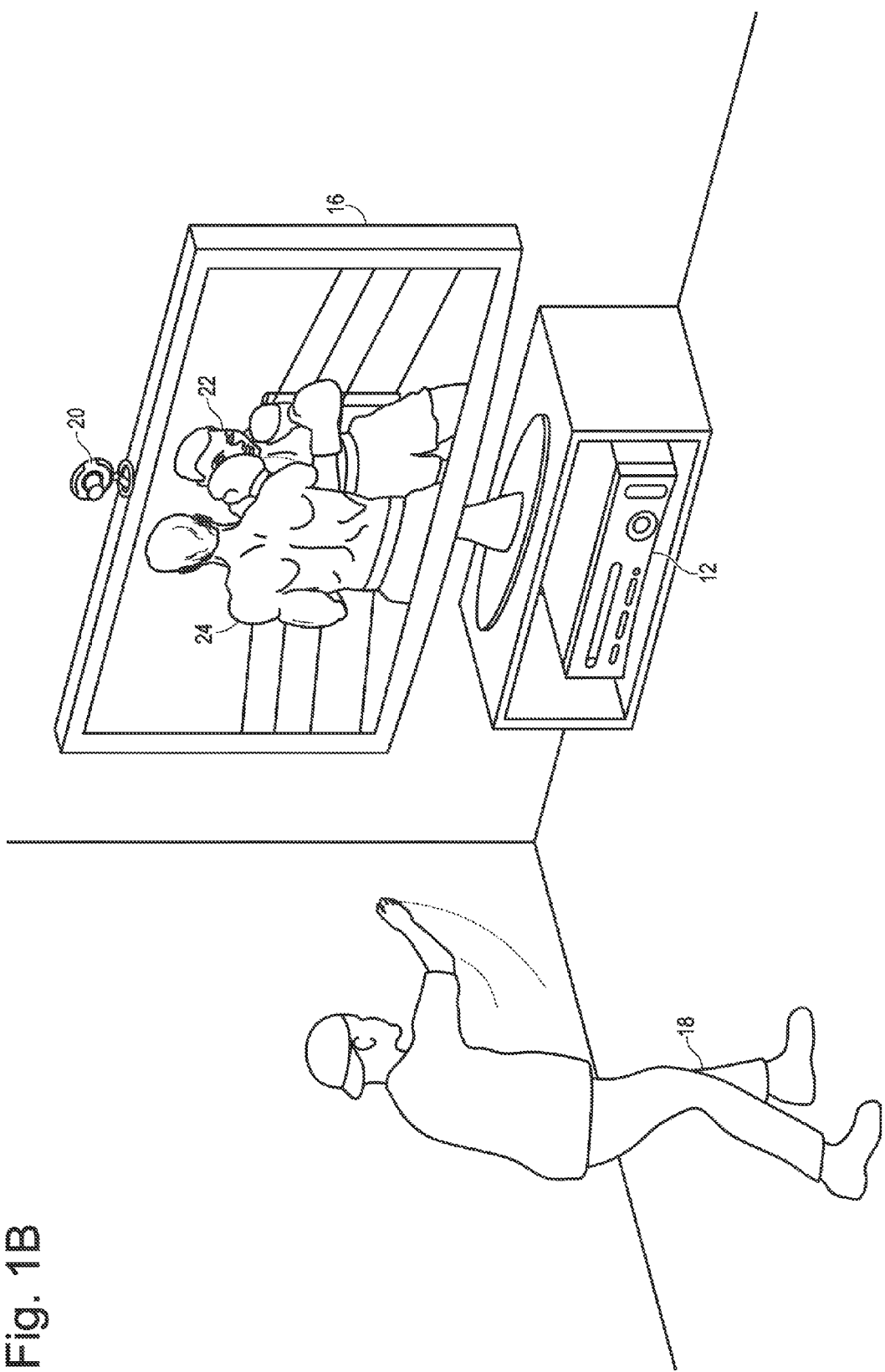

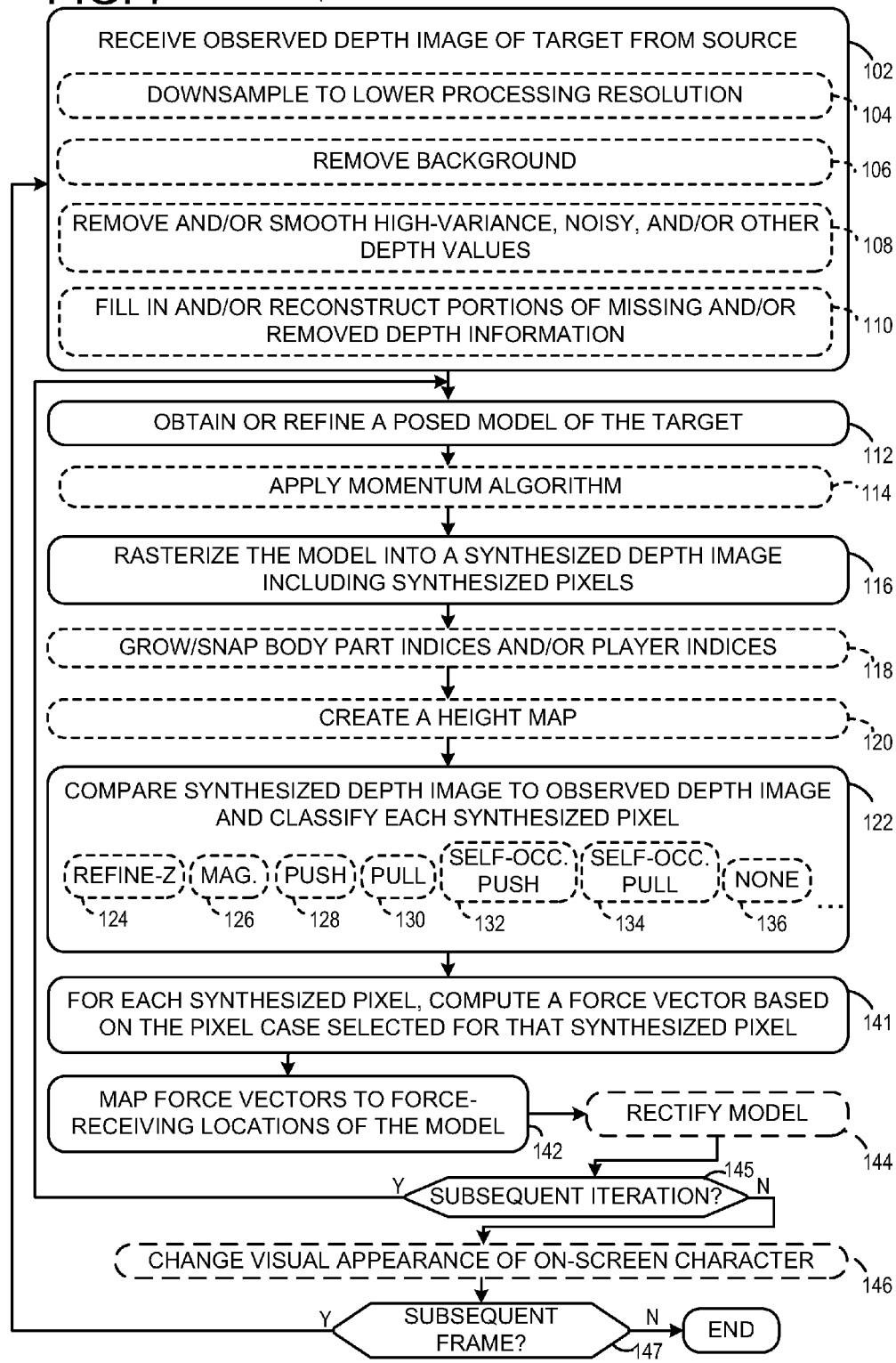

FIG. 18

| Joint | Receives Forces? | Pixel Cases | | | | | | |
|---|---|---|---|---|---|---|---|---|
| | | 1 | 2 | 3 | 4 | 5 | 6 | 7 |
| j1 | Yes | X | X | X | X | X | | X |
| j2 | Yes | X | X | X | X | X | | X |
| j3 | Yes | X | X | X | X | X | | X |
| j4 | Yes | X | X | X | X | X | | X |
| j5 | Yes | X | X | X | X | X | | X |
| j6 | Yes | X | X | X | X | X | | X |
| j7 | Yes | X | X | X | X | X | | X |
| j8 | Yes | X | X | X | X | X | | X |
| j9 | Yes | X | X | X | X | X | | X |
| j10 | Yes | X | X | X | X | X | | X |
| j11 | Yes | X | X | X | X | X | | X |
| j12 | Yes | X | X | X | X | X | | X |
| j13 | Yes | X | X | X | X | X | | X |
| j14 | Yes | X | X | X | X | X | | X |
| j15 | Yes | X | X | X | X | X | | X |
| j16 | Yes | X | X | X | X | X | | X |
| j17 | Yes | | | | | | X | X |
| j18 | Yes | | | | | | X | X |
| j19 | Yes | | | | | | X | X |
| j20 | Yes | | | | | | X | X |
| j21 | Yes | | | | | | X | X |
| j22 | Yes | | | | | | X | X |
| j23 | Yes | X | X | X | X | X | | X |
| j24 | Yes | X | X | X | X | X | | X |
| j25 | Yes | X | X | X | X | X | | X |
| j26 | Yes | X | X | X | X | X | | X |
| j27 | Yes | X | X | X | X | X | | X |
| j28 | Yes | X | X | X | X | X | | X |
| j29 | No | - | - | - | - | - | - | - |
| j30 | No | - | - | - | - | - | - | - |
| j31 | No | - | - | - | - | - | - | - |
| j32 | Yes | X | X | X | X | X | | X |
| j33 | Yes | X | X | X | X | X | | X |
| j34 – j47 | No | - | - | - | - | - | - | - |

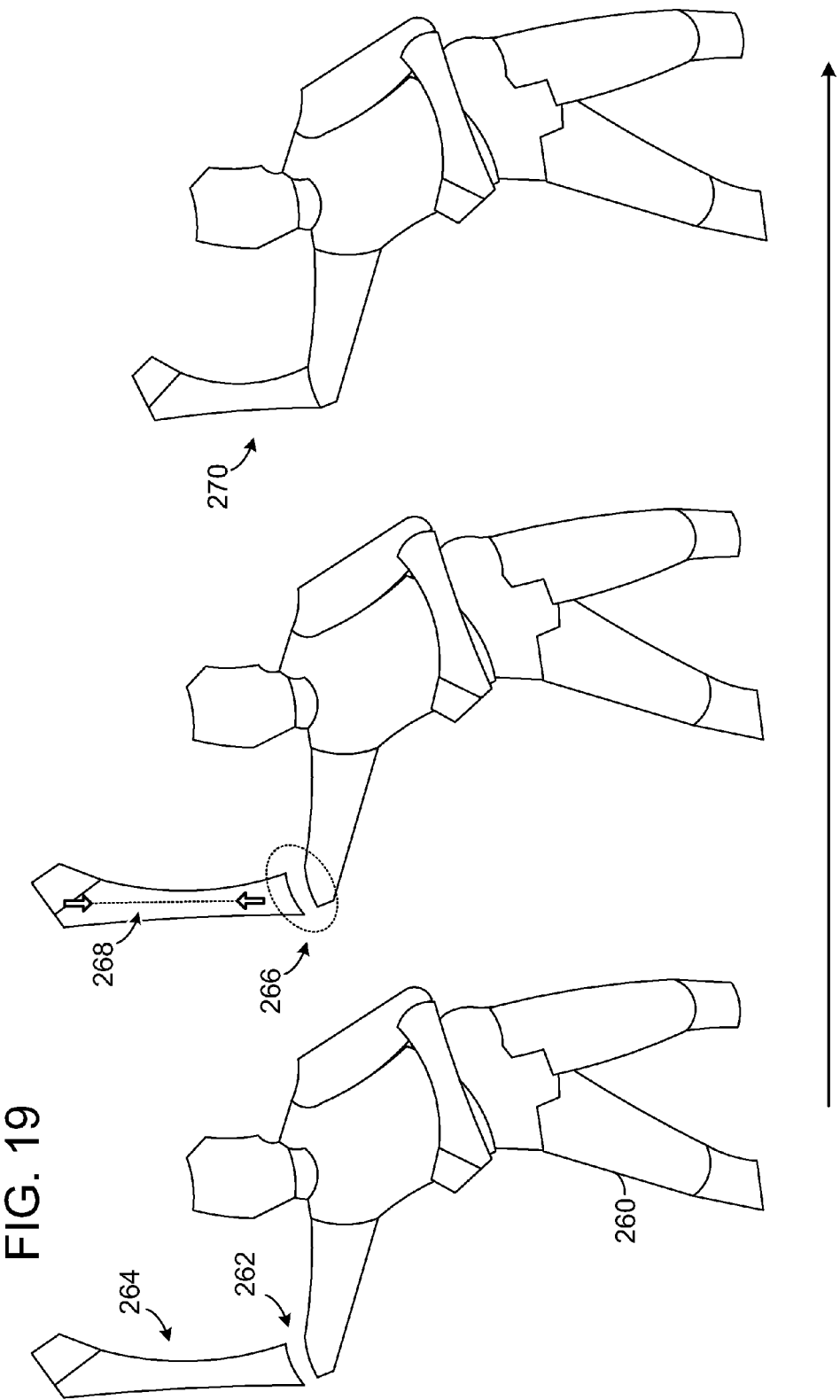

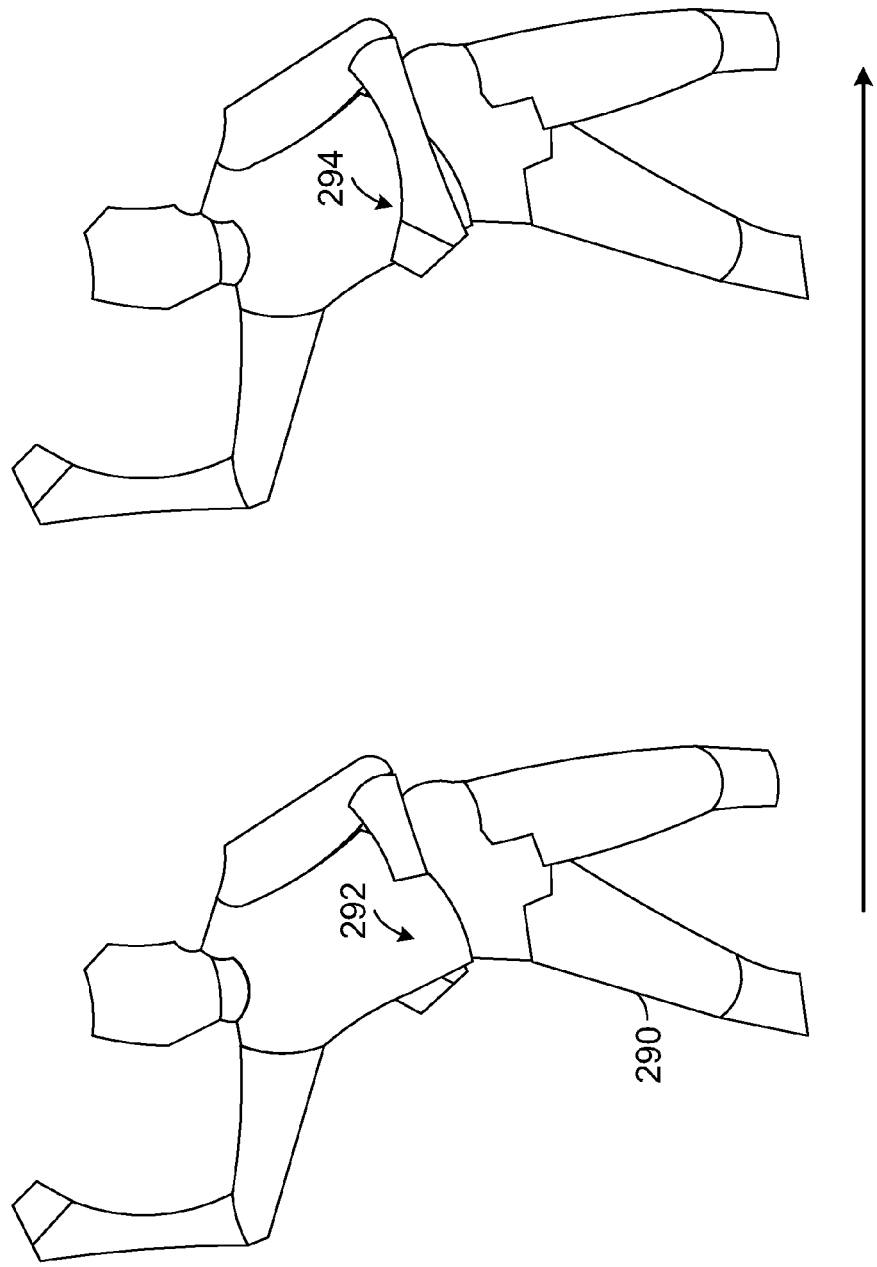

ated Jan. 30, 2009,
VISUAL TARGET TRACKING

CROSS REFERENCE TO RELATED APPLICATIONS

The present application is a continuation-in-part of U.S. patent application Ser. No. 12/363,604, filed Jan. 30, 2009, the entire contents of which are incorporated herein by reference in their entirety for all purposes.

BACKGROUND

Many computer games and other computer vision applications utilize complicated controls to allow users to manipulate game characters or other aspects of an application. Such controls can be difficult to learn, thus creating a barrier to entry for many games or other applications. Furthermore, such controls may be very different from the actual game actions or other application actions for which they are used. For example, a game control that causes a game character to swing a baseball bat may not at all resemble the actual motion of swinging a baseball bat.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments related to visual target tracking are discussed herein. One disclosed embodiment includes representing the target with a model including a plurality of portions, each portion associated with a part index corresponding to a part of the target. A portion of the model is classified with a pixel case based on one or both of the part index associated with the portion of the model and a difference between a modeled position of the portion of the model and an observed position of a corresponding portion of the target. The model is then adjusted in accordance with the pixel case of the portion of the model.

BRIEF DESCRIPTION OF THE DRAWINGS

FIG. 1B shows the game player of FIG. 1A throwing a punch that is tracked and interpreted as a game control that causes a player avatar to throw a punch in game space.

FIG. 7 shows a flow diagram of an example method of visually tracking a target.

FIG. 18 shows a table detailing example relationships between various pixel cases and skeletal model joints.

FIG. 19 illustrates application of constraints to a model representing a target.

FIG. 21 illustrates yet another application of constraints to a model representing a target.

DETAILED DESCRIPTION

The present disclosure is directed to target recognition, analysis, and tracking. In particular, the use of a depth camera or other source for acquiring depth information for one or more targets is disclosed. Such depth information may then be used to efficiently and accurately model and track the one or more targets, as described in detail below. The target recognition, analysis, and tracking described herein provides a robust platform in which one or more targets can be consistently tracked at a relatively fast frame rate, even when the target(s) move into poses that have been considered difficult to analyze using other approaches (e.g., when two or more targets partially overlap and/or occlude one another; when a portion of a target self-occludes another portion of the same target, when a target changes its topographical appearance (e.g., a human touching his or her head), etc.).

Figure 1A:
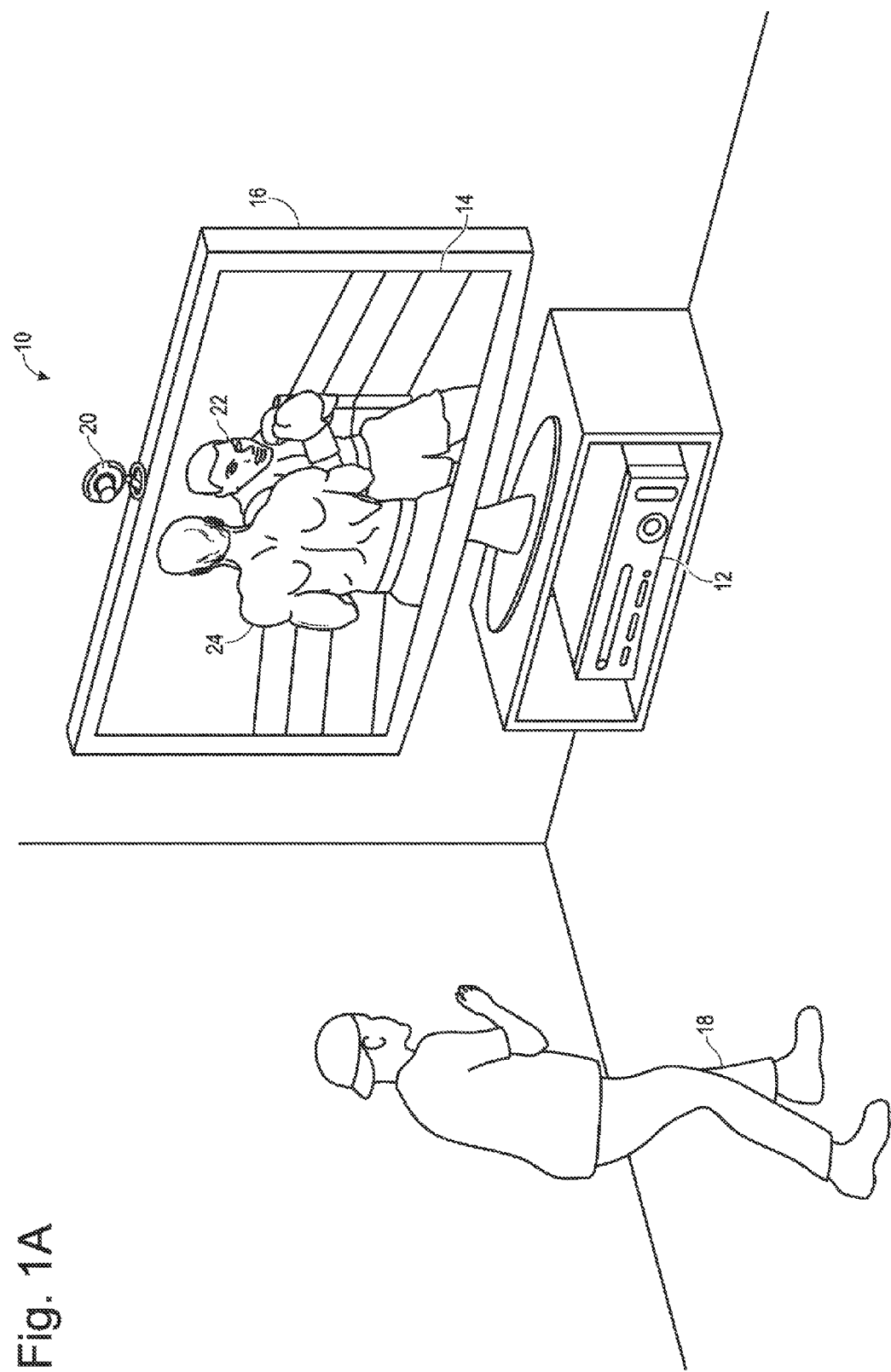
FIG. 1A shows an embodiment of an exemplary target recognition, analysis, and tracking system tracking a game player playing a boxing game.

FIG. 1A shows a nonlimiting example of a target recognition, analysis, and tracking system 10. In particular, FIG. 1A shows a computer gaming system 12 that may be used to play a variety of different games, play one or more different media types, and/or control or manipulate non-game applications. FIG. 1A also shows a display 14 in the form of a high-definition television, or HDTV 16, which may be used to present game visuals to game players, such as game player 18. Furthermore, FIG. 1A shows a capture device in the form of a depth camera 20, which may be used to visually monitor one or more game players, such as game player 18. The example shown in FIG. 1A is nonlimiting. As described below with reference to FIG. 2, a variety of different types of target recognition, analysis, and tracking systems may be used without departing from the scope of this disclosure.

A target recognition, analysis, and tracking system may be used to recognize, analyze, and/or track one or more targets, such as game player 18. FIG. 1A shows a scenario in which game player 18 is tracked using depth camera 20 so that the movements of game player 18 may be interpreted by gaming system 12 as controls that can be used to affect the game being executed by gaming system 12. In other words, game player 18 may use his movements to control the game. The movements of game player 18 may be interpreted as virtually any type of game control.

The example scenario illustrated in FIG. 1A shows game player 18 playing a boxing game that is being executed by gaming system 12. The gaming system uses HDTV 16 to visually present a boxing opponent 22 to game player 18. Furthermore, the gaming system uses HDTV 16 to visually present a player avatar 24 that gaming player 18 controls with his movements. As shown in FIG. 1B, game player 18 can throw a punch in physical space as an instruction for player avatar 24 to throw a punch in game space. Gaming system 12 and depth camera 20 can be used to recognize and analyze the punch of game player 18 in physical space so that the punch can be interpreted as a game control that causes player avatar 24 to throw a punch in game space. For example, FIG. 1B shows HDTV 16 visually presenting player avatar 24 throwing a punch that strikes boxing opponent 22 responsive to game player 18 throwing a punch in physical space.

Other movements by game player 18 may be interpreted as other controls, such as controls to bob, weave, shuffle, block, jab, or throw a variety of different power punches. Furthermore, some movements may be interpreted into controls that serve purposes other than controlling player avatar 24. For example, the player may use movements to end, pause, or save a game, select a level, view high scores, communicate with a friend, etc.

In some embodiments, a target may include a human and an object. In such embodiments, for example, a player of an electronic game may be holding an object, such that the motions of the player and the object are utilized to adjust and/or control parameters of the electronic game. For example, the motion of a player holding a racket may be tracked and utilized for controlling an on-screen racket in an electronic sports game. In another example, the motion of a player holding an object may be tracked and utilized for controlling an on-screen weapon in an electronic combat game.

Target recognition, analysis, and tracking systems may be used to interpret target movements as operating system and/or application controls that are outside the realm of gaming. Virtually any controllable aspect of an operating system and/or application, such as the boxing game shown in FIGS. 1A and 1B, may be controlled by movements of a target, such as game player 18. The illustrated boxing scenario is provided as an example, but is not meant to be limiting in any way. To the contrary, the illustrated scenario is intended to demonstrate a general concept, which may be applied to a variety of different applications without departing from the scope of this disclosure.

Figure 2:
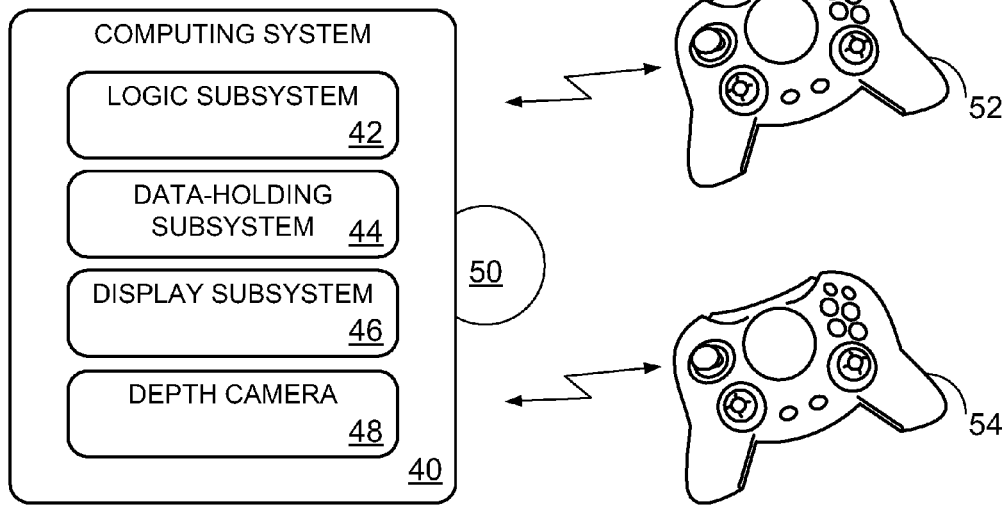
FIG. 2 schematically shows a computing system in accordance with an embodiment of the present disclosure.

The methods and processes described herein may be tied to a variety of different types of computing systems. FIGS. 1A and 1B show a nonlimiting example in the form of gaming system 12, HDTV 16, and depth camera 20. As another, more general, example, FIG. 2 schematically shows a computing system 40 that may perform one or more of the target recognition, tracking, and analysis methods and processes described herein. Computing system 40 may take a variety of different forms, including, but not limited to, gaming consoles, personal computing gaming systems, military tracking and/or targeting systems, and character acquisition systems offering green-screen or motion-capture functionality, among others.

Computing system 40 may include a logic subsystem 42, a data-holding subsystem 44, a display subsystem 46, and/or a capture device 48. The computing system may optionally include components not shown in FIG. 2, and/or some components shown in FIG. 2 may be peripheral components that are not integrated into the computing system.

Logic subsystem 42 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 44 may include one or more physical devices configured to hold data and/or instructions executable by the logic subsystem to implement the herein described methods and processes. When such methods and processes are implemented, the state of data-holding subsystem 44 may be transformed (e.g., to hold different data). Data-holding subsystem 44 may include removable media and/or built-in devices. Data-holding subsystem 44 may include optical memory devices, semiconductor memory devices (e.g., RAM, EEPROM, flash, etc.), and/or magnetic memory devices, among others. Data-holding subsystem 44 may include devices with one or more of the following characteristics: volatile, nonvolatile, dynamic, static, read/write, read-only, random access, sequential access, location addressable, file addressable, and content addressable. In some embodiments, logic subsystem 42 and data-holding subsystem 44 may be integrated into one or more common devices, such as an application specific integrated circuit or a system on a chip.

FIG. 2 also shows an aspect of the data-holding subsystem in the form of computer-readable removable media 50, which may be used to store and/or transfer data and/or instructions executable to implement the herein described methods and processes.

Display subsystem 46 may be used to present a visual representation of data held by data-holding subsystem 44. As the herein described methods and processes change the data held by the data-holding subsystem, and thus transform the state of the data-holding subsystem, the state of display subsystem 46 may likewise be transformed to visually represent changes in the underlying data. As a nonlimiting example, the target recognition, tracking, and analysis described herein may be reflected via display subsystem 46 in the form of a game character that changes poses in game space responsive to the movements of a game player in physical space. Display subsystem 46 may include one or more display devices utilizing virtually any type of technology. Such display devices may be combined with logic subsystem 42 and/or data-holding subsystem 44 in a shared enclosure, or such display devices may be peripheral display devices, as shown in FIGS. 1A and 1B.

Computing system 40 further includes a capture device 48 configured to obtain depth images of one or more targets. Capture device 48 may be configured to capture video with depth information via any suitable technique (e.g., time-offlight, structured light, stereo image, etc.). As such, capture device 48 may include a depth camera, a video camera, stereo cameras, and/or other suitable capture devices.

For example, in time-of-flight analysis, the capture device 48 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 48 to capture depth information. In such an analysis, patterned light (i.e., light displayed as a known pattern such as grid pattern or a stripe pattern) may be projected onto the target. Upon striking the surface of the target, the pattern may become deformed in response, and this deformation of the pattern may be studied to determine a physical distance from the capture device to a particular location on the target.

In another example, the capture device may include two or more physically separated cameras that view a target from different angles, to obtain visual stereo data. In such cases, the visual stereo data may be resolved to generate a depth image.

In other embodiments, capture device 48 may utilize other technologies to measure and/or calculate depth values. Additionally, capture device 48 may organize the calculated depth information into "Z layers," i.e., layers perpendicular to a Z axis extending from the depth camera along its line of sight to the viewer.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 40 may optionally include one or more input devices, such as controller 52 and controller 54. Input devices may be used to control operation of the computing system. In the context of a game, input devices, such as controller 52 and/or controller 54 can be used to control aspects of a game not controlled via the target recognition, tracking, and analysis methods and procedures described herein. In some embodiments, input devices such as controller 52 and/or controller 54 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

Computing system 40 may be configured to perform the target tracking methods described herein. However, it should be understood that computing system 40 is provided as a nonlimiting example of a device that may perform such target tracking. Other devices are within the scope of this disclosure.

Computing system 40, or another suitable device, may be configured to represent each target with a model. As described in more detail below, information derived from such a model can be compared to information obtained from a capture device, such as a depth camera, so that the fundamental proportions or shape of the model, as well as its current pose, can be adjusted to more accurately represent the modeled target. The model may be represented by one or more polygonal meshes, by a set of mathematical primitives, and/or via other suitable machine representations of the modeled target.

Figure 3:
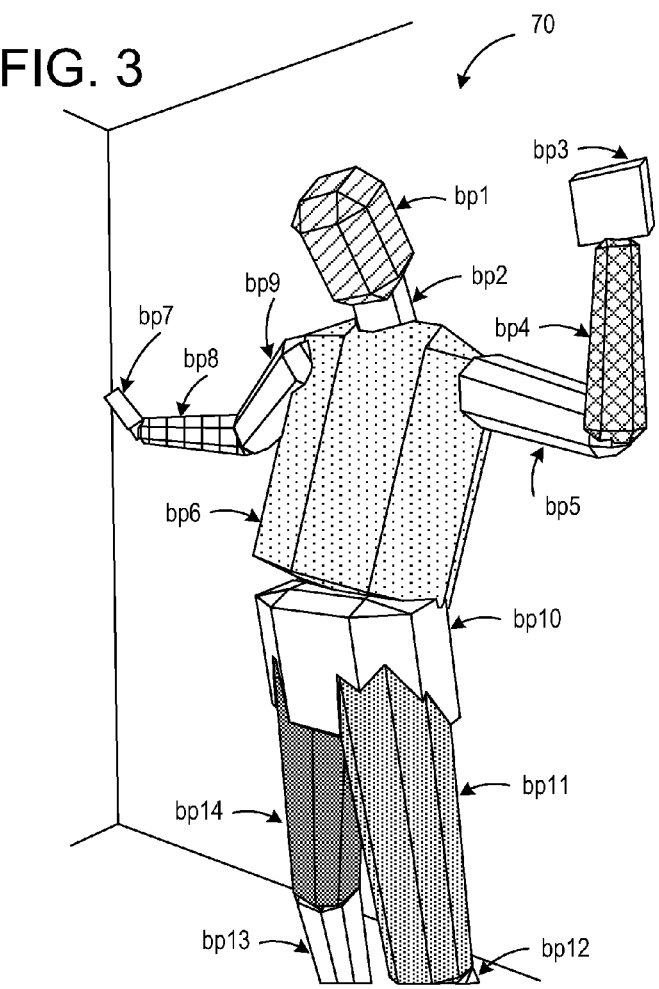
FIG. 3 shows an exemplary body model used to represent a human target.

FIG. 3 shows a nonlimiting visual representation of an example body model 70. Body model 70 is a machine representation of a modeled target (e.g., game player 18 from FIGS. 1A and 1B). The body model may include one or more data structures that include a set of variables that collectively define the modeled target in the language of a game or other application/operating system.

A model of a target can be variously configured without departing from the scope of this disclosure. In some examples, a model (e.g., a machine-readable model) may include one or more data structures that represent a target as a three-dimensional model comprising rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

Further, the target may be represented by a model including a plurality of portions, each portion associated with a part index corresponding to a part of the target. Thus, for the case where the target is a human target, the part index may be a body-part index corresponding to a part of the human target. For example, body model 70 of FIG. 3 includes body parts bp1 through bp14, each of which represents a different portion of the modeled target. Each body part is a three-dimensional shape. For example, bp3 is a rectangular prism that represents the left hand of a modeled target, and bp5 is an octagonal prism that represents the left upper-arm of the modeled target. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may comprise one or more structural members (i.e., "bones"), with joints located at the intersection of adjacent bones. It is to be understood that some bones may correspond to anatomical bones in a human target and/or some bones may not have corresponding anatomical bones in the human target.

As an example, a human target may be modeled as a skeleton including a plurality of skeletal points, each skeletal point having a three-dimensional location in world space. The various skeletal points may correspond to actual joints of a human target, terminal ends of a human target's extremities, and/or points without a direct anatomical link to the human target. Each skeletal point has at least three degrees of freedom (e.g., world space x, y, z). As such, the skeleton can be fully defined by $3\times\lambda$ values, where $\lambda$ is equal to the total number of skeletal points included in the skeleton. A skeleton with 33 skeletal points can be defined by 99 values, for example. As described in more detail below, some skeletal points may account for axial roll angles.

Figure 4:
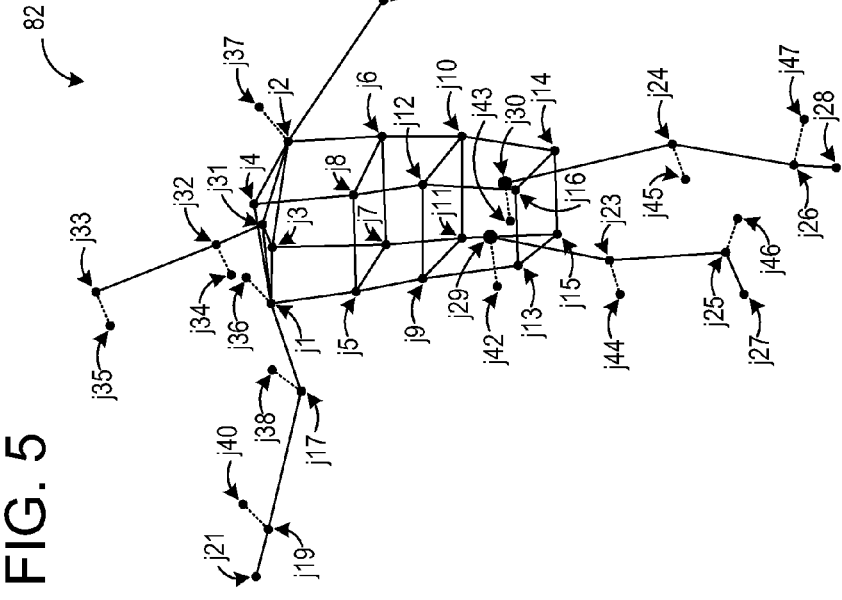
FIG. 4 shows a substantially frontal view of an exemplary skeletal model used to represent a human target.
Figure 5:
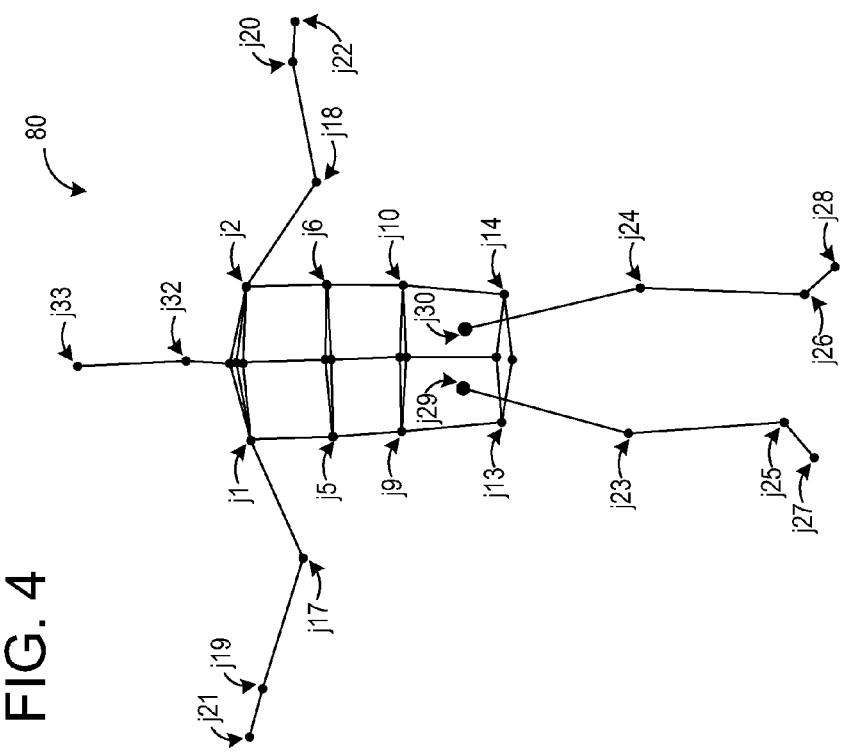
FIG. 5 shows a skewed view of an exemplary skeletal model used to represent a human target.

The bones and joints may collectively make up a skeletal model, which may be a constituent element of the model. The skeletal model may include one or more skeletal members for each body part and a joint between adjacent skeletal members. Exemplary skeletal model 80 and exemplary skeletal model 82 are shown in FIGS. 4 and 5, respectively. FIG. 4 shows a skeletal model 80 as viewed from the front, with joints j1 through j33. FIG. 5 shows a skeletal model 82 as viewed from a skewed view, also with joints j1 through j33. Skeletal model 82 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). Thus, whereas joints can receive forces and adjust the skeletal model, as described below, roll joints may instead be constructed and utilized to track axial roll angles. More generally, by examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Figure 6:
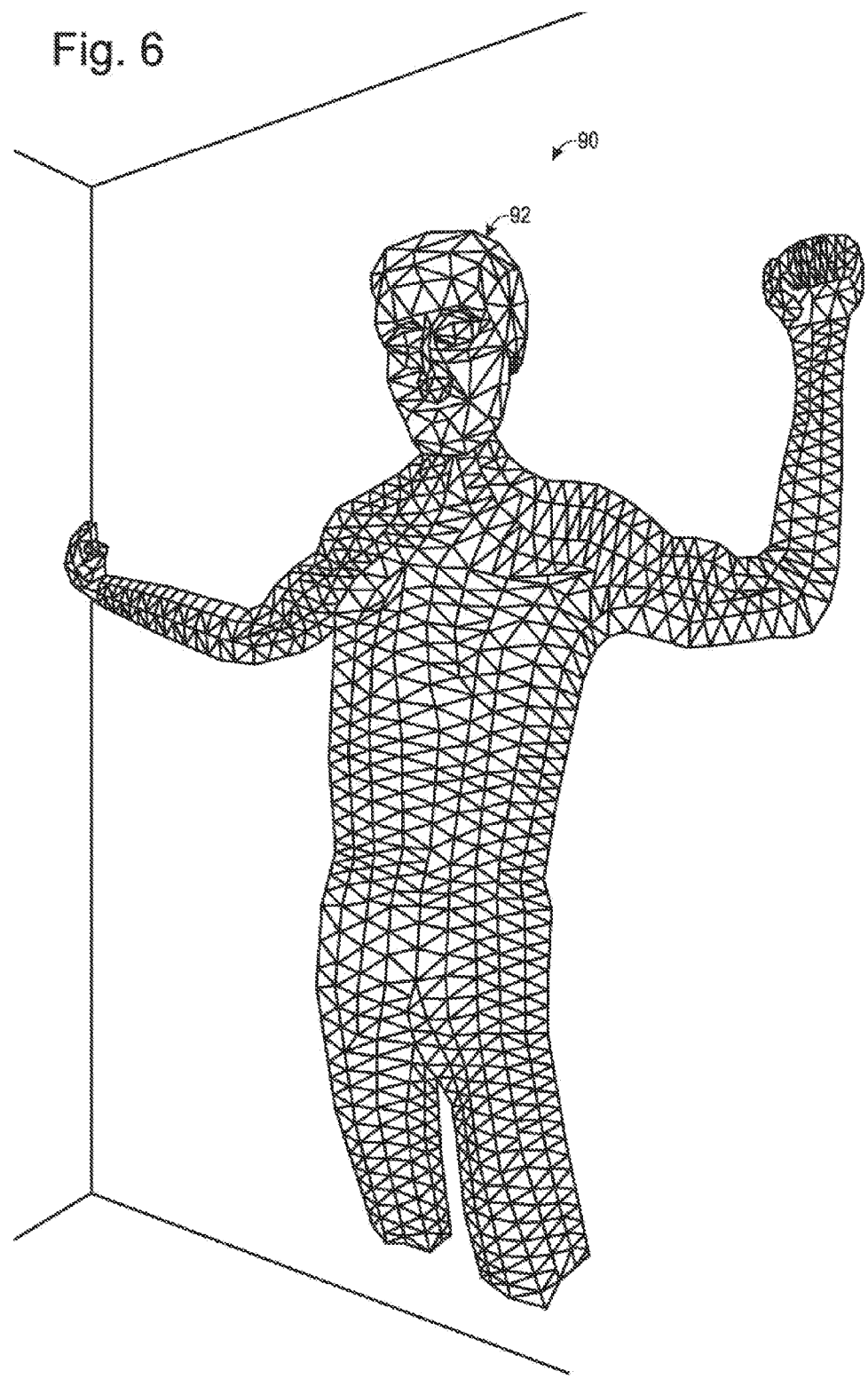
FIG. 6 shows an exemplary mesh model used to represent a human target.

As described above, some models may include a skeleton and/or body parts that serve as a machine representation of a modeled target. In some embodiments, a model may alternatively or additionally include a wireframe mesh, which may include hierarchies of rigid polygonal meshes, one or more deformable meshes, or any combination of the two. As a nonlimiting example, FIG. 6 shows a model 90 including a plurality of triangles (e.g., triangle 92) arranged in a mesh that defines the shape of the body model. Such a mesh may include bending limits at each polygonal edge. When a mesh is used, the number of triangles, and/or other polygons, that collectively constitute the mesh can be selected to achieve a desired balance between quality and computational expense. More triangles may provide higher quality and/or more accurate models, while fewer triangles may be less computationally demanding. A body model including a polygonal mesh need not include a skeleton, although it may in some embodiments.

The above described body part models, skeletal models, and polygonal meshes are nonlimiting example types of models that may be used as machine representations of a modeled target. Other models are also within the scope of this disclosure. For example, some models may include patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that any model that can be posed and then rasterized to (or otherwise rendered to or expressed by) a synthesized depth image, is compatible with the herein described target recognition, analysis, and tracking.

As mentioned above, a model serves as a representation of a target, such as game player 18 in FIGS. 1A and 1B. As the target moves in physical space, information from a capture device, such as depth camera 20 in FIGS. 1A and 1B, can be used to adjust a pose and/or the fundamental size/shape of the model so that it more accurately represents the target. In particular, one or more forces may be applied to one or more force-receiving aspects of the model to adjust the model into a pose that more closely corresponds to the pose of the target in physical space. Depending on the type of model that is being used, the force may be applied to a joint, a centroid of a body part, a vertex of a triangle, or any other suitable force-receiving aspect of the model. Furthermore, in some embodiments, two or more different calculations may be used when determining the direction and/or magnitude of the force. As described in more detail below, differences between an observed image of the target, as retrieved by a capture device, and a rasterized (i.e., synthesized) image of the model may be used to determine the forces that are applied to the model in order to adjust the body into a different pose.

FIG. 7 shows a flow diagram of an example method 100 of tracking a target using a model (e.g., body model 70 of FIG. 3). In some embodiments, the target may be a human, and the human may be one of two or more targets being tracked. As such, in some embodiments, method 100 may be executed by a computing system (e.g., gaming system 12 shown in FIG. 1 and/or computing system 40 shown in FIG. 2) to track one or more players interacting with an electronic game being played on the computing system. As introduced above, tracking of the players allows physical movements of those players to act as a real-time user interface that adjusts and/or controls parameters of the electronic game. For example, the tracked motions of a player may be used to move an on-screen character or avatar in an electronic role-playing game. In another example, the tracked motions of a player may be used to control an on-screen vehicle in an electronic racing game. In yet another example, the tracked motions of a player may be used to control the building or organization of objects in a virtual environment.

At 102, method 100 includes receiving an observed depth image of the target from a source. In some embodiments, the source may be a depth camera configured to obtain depth information about the target via a suitable technique such as time-of-flight analysis, structured light analysis, stereo vision analysis, or other suitable techniques. The observed depth image may include a plurality of observed pixels, where each observed pixel has an observed depth value. The observed depth value includes depth information of the target as viewed from the source. Knowing the depth camera's horizontal and vertical field of view, as well as the depth value for a pixel and the pixel address of that pixel, the world space position of a surface imaged by that pixel can be determined. For convenience, the world space position of a surface imaged by the pixel may be referred to as the world space position of the pixel.

Figure 8:
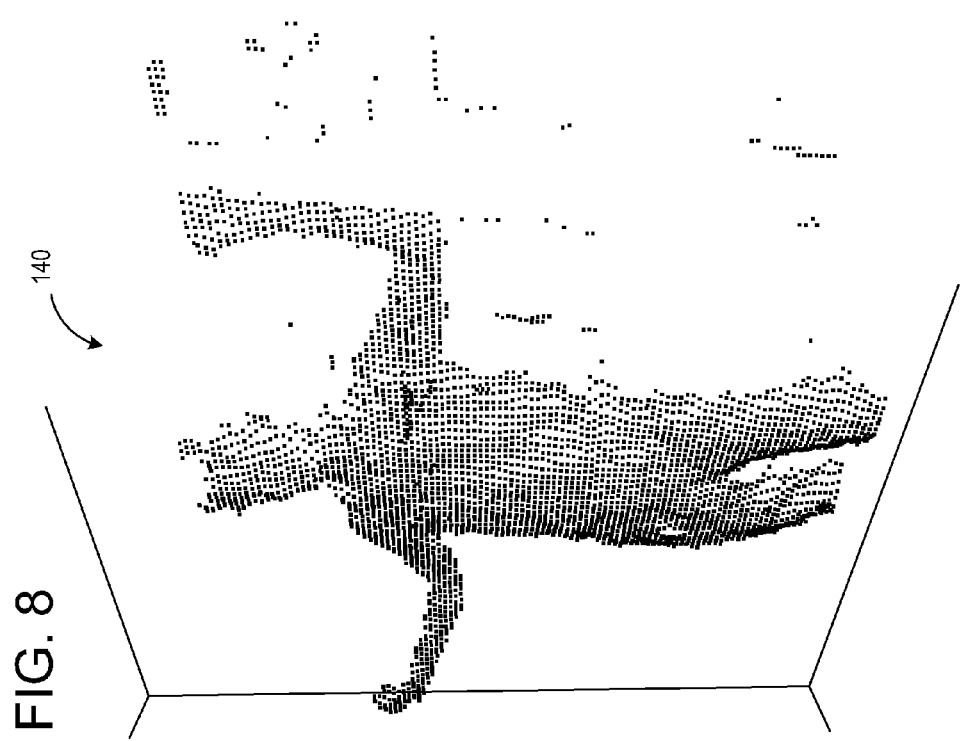
FIG. 8 shows an exemplary observed depth image.

FIG. 8 shows a visual representation of an exemplary observed depth image 140. As shown, observed depth image 140 captures an exemplary observed pose of a person (e.g., game player 18) standing with his arms raised.

As shown at 104 of FIG. 7, upon receiving the observed depth image, method 100 may optionally include downsampling the observed depth image to a lower processing resolution. Downsampling to a lower processing resolution may allow the observed depth image to be more easily utilized and/or more quickly processed with less computing overhead.

As shown at 106, upon receiving the observed depth image, method 100 may optionally include removing non-player background elements from the observed depth image. Removing such background elements may include separating various regions of the observed depth image into background regions and regions occupied by the image of the target. Background regions can be removed from the image or identified so that they can be ignored during one or more subsequent processing steps. Virtually any background removal technique may be used, and information from tracking (and from the previous frame) can optionally be used to assist and improve the quality of background-removal.

As shown at 108, upon receiving the observed depth image, method 100 may optionally include removing and/or smoothing one or more high-variance and/or noisy depth values from the observed depth image. Such high-variance and/or noisy depth values in the observed depth image may result from a number of different sources, such as random and/or systematic errors occurring during the image capturing process, defects and/or aberrations resulting from the capture device, etc. Since such high-variance and/or noisy depth values may be artifacts of the image capturing process, including these values in any future analysis of the image may skew results and/or slow calculations. Thus, removal of such values may provide better data integrity for future calculations.

Other depth values may also be filtered. For example, the accuracy of growth operations described below with reference to step 118 may be enhanced by selectively removing pixels satisfying one or more removal criteria. For instance, if a depth value is halfway between a hand and the torso that the hand is occluding, removing this pixel can prevent growth operations from spilling from one body part onto another during subsequent processing steps.

As shown at 110, method 100 may optionally include filling in and/or reconstructing portions of missing and/or removed depth information. Such backfilling may be accomplished by averaging nearest neighbors, filtering, and/or any other suitable method.

As shown at 112 of FIG. 7, method 100 may include obtaining a model (e.g., body model 70 of FIG. 3). As described above, the model may include a skeleton comprising a plurality of skeletal points, one or more polygonal meshes, one or more mathematical primitives, one or more high-order surfaces, and/or other features used to provide a machine representation of the target. Furthermore, the model may exist as an instance of one or more data structures existing on a computing system.

In some embodiments of method 100, the model may be a posed model obtained from a previous time step (i.e., frame). For example, if method 100 is performed continuously, a posed model resulting from a previous iteration of method 100, corresponding to a previous time step, may be obtained. In this way, the model may be adjusted from one frame to the next based on the observed depth image for the current frame and the model from the previous frame. In some cases, the previous frame's model may be projected by a momentum calculation to yield an estimated model for comparison to the current observed depth image. This may be done without looking up a model from a database or otherwise starting from scratch every frame. Instead, incremental changes may be made to the model in successive frames.

In some embodiments, a pose may be determined by one or more algorithms, which can analyze a depth image and identify, at a coarse level, where the target(s) of interest (e.g., human(s)) are located and/or the pose of such target(s). Algorithms can be used to select a pose during an initial iteration or whenever it is believed that the algorithm can select a pose more accurate than the pose calculated during a previous time step.

In some embodiments, the model may be obtained from a database and/or other program. For example, a model may not be available during a first iteration of method 100, in which case the model may be obtained from a database including one or more models. In such a case, a model from the database may be chosen using a searching algorithm designed to select a model exhibiting a pose similar to that of the target. Even if a model from a previous time step is available, a model from a database may be used. For example, a model from a database may be used after a certain number of frames, if the target has changed poses by more than a predetermined threshold, and/or according to other criteria.

In other embodiments, the model, or portions thereof, may be synthesized. For example, if the target's body core (torso, midsection, and hips) are represented by a deformable polygonal model, that model may be originally constructed using the contents of an observed depth image, where the outline of the target in the image (i.e., the silhouette) may be used to shape the mesh in the X and Y dimensions. Additionally, in such an approach, the observed depth value(s) in that area of the observed depth image may be used to "mold" the mesh in the XY direction, as well as in the Z direction, of the model to more favorably represent the target's body shape.

Another approach for obtaining a model is described in U.S. patent application Ser. No. 12/603,437, Filed Oct. 21, 2009, the contents of which are hereby incorporated herein by reference in their entirety.

Method 100 may further include representing any clothing appearing on the target using a suitable approach. Such a suitable approach may include adding to the model auxiliary geometry in the form of primitives or polygonal meshes, and optionally adjusting the auxiliary geometry based on poses to reflect gravity, cloth simulation, etc. Such an approach may facilitate molding the models into more realistic representations of the targets.

As shown at 114, method 100 may optionally comprise applying a momentum algorithm to the model. Because the momentum of various parts of a target may predict change in an image sequence, such an algorithm may assist in obtaining the pose of the model. The momentum algorithm may use a trajectory of each of the joints or vertices of a model over a fixed number of a plurality of previous frames to assist in obtaining the model.

In some embodiments, knowledge that different portions of a target can move a limited distance in a time frame (e.g., $\frac{1}{30}^{th}$ or $\frac{1}{60}^{th}$ of a second) can be used as a constraint in obtaining a model. Such a constraint may be used to rule out certain poses when a prior frame is known.

At 116 of FIG. 7, method 100 may also include rasterizing the model into a synthesized depth image. Rasterization allows the model described by mathematical primitives, polygonal meshes, or other objects to be converted into a synthesized depth image described by a plurality of pixels.

Rasterizing may be carried out using one or more different techniques and/or algorithms. For example, rasterizing the model may include projecting a representation of the model onto a two-dimensional plane. In the case of a model including a plurality of body-part shapes (e.g., body model 70 of FIG. 3), rasterizing may include projecting and rasterizing the collection of body-part shapes onto a two-dimensional plane. For each pixel in the two dimensional plane onto which the model is projected, various different types of information may be stored.

Figure 9:
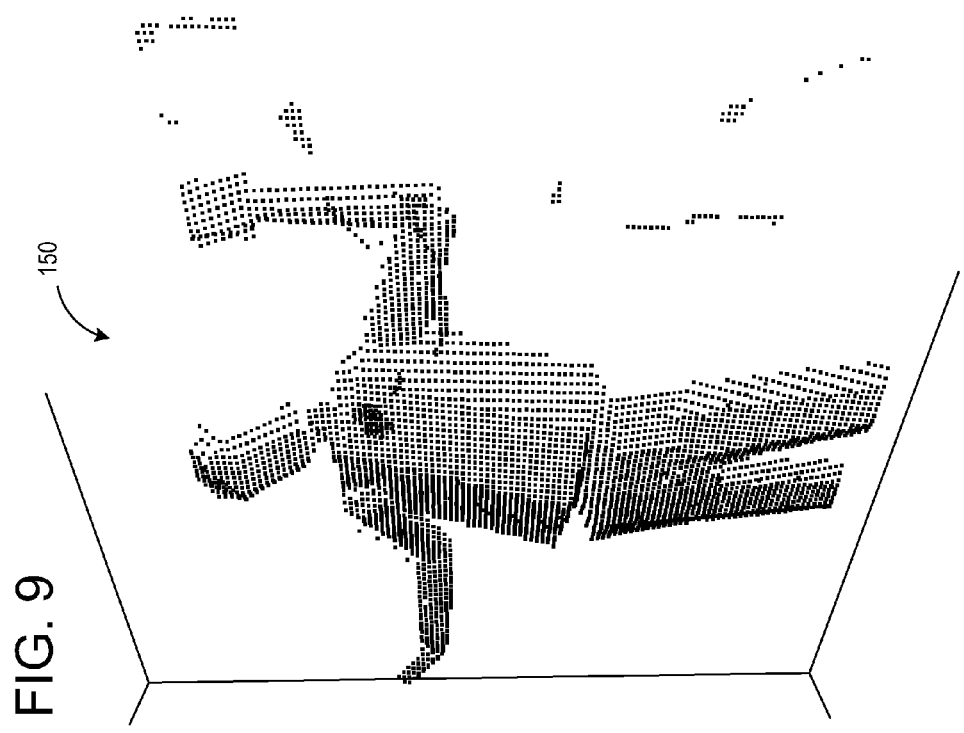
FIG. 9 shows an exemplary synthesized depth image.
Figure 10:
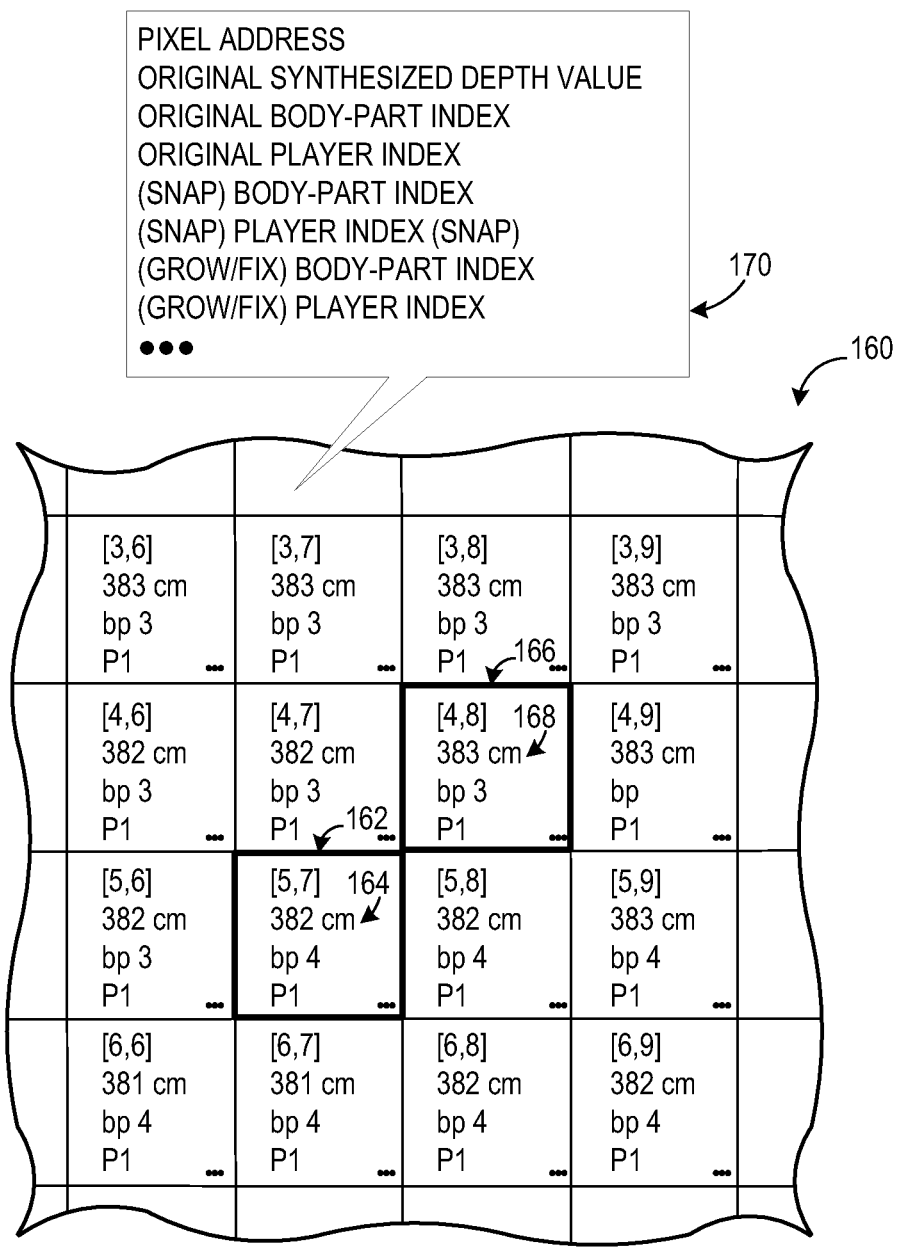
FIG. 10 schematically shows some of the pixels making up a synthesized depth image.

FIG. 9 shows a visual representation 150 of an exemplary synthesized depth image corresponding to body model 70 of FIG. 3. FIG. 10 shows a pixel matrix 160 of a portion of the same synthesized depth image. As indicated at 170, each synthesized pixel in the synthesized depth image may include a synthesized depth value. The synthesized depth value for a given synthesized pixel may be the depth value from the corresponding part of the model that is represented by that synthesized pixel, as determined during rasterization. In other words, if a portion of a forearm body part (e.g., forearm body part bp4 of FIG. 3) is projected onto a two-dimensional plane, a corresponding synthesized pixel (e.g., synthesized pixel 162 of FIG. 10) may be given a synthesized depth value (e.g., synthesized depth value 164 of FIG. 10) equal to the depth value of that portion of the forearm body part. In the illustrated example, synthesized pixel 162 has a synthesized depth value of 382 cm. Likewise, if a neighboring hand body part (e.g., hand body part bp3 of FIG. 3) is projected onto a two-dimensional plane, a corresponding synthesized pixel (e.g., synthesized pixel 166 of FIG. 10) may be given a synthesized depth value (e.g., synthesized depth value 168 of FIG. 10) equal to the depth value of that portion of the hand body part. In the illustrated example, synthesized pixel 166 has a synthesized depth value of 383 cm. The corresponding observed depth value is the depth value observed by the depth camera at the same pixel address. It is to be understood that the above is provided as an example. Synthesized depth values may be saved in any unit of measurement or as a dimensionless number.

As indicated at 170, each synthesized pixel in the synthesized depth image may include an original body-part index determined during rasterization. Such an original body-part index may indicate to which of the body parts of the model that pixel corresponds. In the illustrated example of FIG. 10, synthesized pixel 162 has an original body-part index of bp4, and synthesized pixel 166 has an original body-part index of bp3. In some embodiments, the original body-part index of a synthesized pixel may be nil if the synthesized pixel does not correspond to a body part of the target (e.g., if the synthesized pixel is a background pixel). In some embodiments, synthesized pixels that do not correspond to a body part may be given a different type of index. A body-part index may be a discrete value or a probability distribution indicating the likelihood that a pixel belongs to two or more different body parts.

As indicated at 170, each synthesized pixel in the synthesized depth image may include an original player index determined during rasterization, where the original player index corresponds to the target. For example, if there are two targets, synthesized pixels corresponding to the first target will have a first player index and synthesized pixels corresponding to the second target will have a second player index. In the illustrated example, the pixel matrix 160 corresponds to only one target, therefore synthesized pixel 162 has an original player index of P1, and synthesized pixel 166 has an original player index of P1. Other types of indexing systems may be used without departing from the scope of this disclosure.

As indicated at 170, each synthesized pixel in the synthesized depth image may include a pixel address. The pixel address may define the position of a pixel relative to other pixels. In the illustrated example, synthesized pixel 162 has a pixel address of [5,7], and synthesized pixel 166 has a pixel address of [4,8]. It is to be understood that other addressing schemes may be used without departing from the scope of this disclosure.

As indicated at 170, each synthesized pixel may optionally include other types of information, some of which may be obtained after rasterization. For example, each synthesized pixel may include an updated body-part index, which may be determined as part of a snap operation performed during rasterization, as described below. Each synthesized pixel may include an updated player index, which may be determined as part of a snap operation performed during rasterization. Each synthesized pixel may include an updated body-part index, which may be obtained as part of a grow/fix operation, as described below. Each synthesized pixel may include an updated player index, which may be obtained as part of a grow/fix operation, as described above. Each synthesized pixel may include an updated synthesized depth value, which may be obtained as part of the snap operation.

The example types of pixel information provided above are not limiting. Various different types of information may be stored as part of each pixel. Such information may include information obtained from the depth image, information obtained from rasterizing the machine-readable model, and/or information derived from one or more processing operations (e.g., snap operation, grow operation, etc.). Such information can be stored as part of a common data structure, or the different types of information may be stored in different data structures that can be mapped to particular pixel locations (e.g., via a pixel address). As an example, player indices and/or body-part indices obtained as part of a snap operation during rasterization may be stored in a rasterization map and/or a snap map, while player indices and/or body-part indices obtained as part of a grow/fix operation after rasterization may be stored in a grow map, as described below. Nonlimiting examples of other types of pixel information that may be assigned to each pixel include, but are not limited to, joint indices, bone indices, vertex indices, triangle indices, centroid indices, and the like.

While distinctions have been made between observed pixels and synthesized pixels, it is to be understood that such distinctions are made only for simplicity of description. At every pixel address, data may be used to represent observed information obtained from a depth camera or other source. Likewise, at every pixel address, data may be used to represent information that is rasterized, derived, calculated, or otherwise synthesized. When observed data (e.g., an observed depth value) is considered for a particular pixel, that pixel may be referred to as an observed pixel. When synthesized data (e.g., a synthesized depth value) is considered for the same pixel, that same pixel may be referred to as a synthesized pixel. As such, a comparison can be made between an observed pixel and a synthesized pixel at the same pixel address by comparing observed data at that pixel address with synthesized data at that pixel address.

At 118, method 100 of FIG. 7 may optionally include snapping and/or growing the body-part indices and/or player indices. In other words, the synthesized depth image may be augmented so that the body-part index and/or player index of some pixels are changed in an attempt to more closely correspond to the modeled target. When referring to a body-part index or a player index without specifically referring to the indices initially derived from rasterization, the indices derived from the snap operation, or the indices derived from the grow operation, it is to be understood that any one or more of these indices may be used, as well as other indices obtained from other suitable methods of estimating the player and/or body part to which that pixel belongs.

In performing the above described rasterizations, one or more Z-Buffers and/or body-part/player index maps may be constructed. As a nonlimiting example, a first version of such a buffer/map may be constructed by performing a Z-test in which a forward-most surface closest to the viewer (e.g., depth camera) at each pixel is selected and a body-part index and/or player index associated with that surface is written to the corresponding pixel. This map may be referred to as the rasterization map or the original synthesized depth map, and this map may include the original body-part index for each pixel. A second version of such a buffer/map may be constructed by performing a Z-test in which a surface of the model that is closest to an observed depth value at that pixel is selected and a body-part index and/or player index associated with that surface is written to the corresponding pixel. This may be referred to as the snap map, and this map may include the snap body-part index for each pixel. Such tests may be constrained so as to reject a Z-distance between a synthesized depth value and an observed depth value that is beyond a predetermined threshold. In some embodiments, two or more Z-buffers and/or two or more body-part/player index maps may be maintained, thus allowing two or more of the above described tests to be carried out.

A third version of a buffer/map may be constructed by growing and/or correcting a body-part/player index map. This may be referred to as a grow map. Starting with a copy of the snap map described above, the values may be grown over any "unknown" values within a predetermined Z-distance, so that a space being occupied by the target, but not yet occupied by the body model, may be filled with proper body-part/player indices. Such an approach may further include overtaking a known value if a more favorable match is identified.

The grow map may begin with a pass over synthesized pixels of the snap map to detect pixels having neighboring pixels with a different body-part/player index. These may be considered "edge" pixels, i.e., frontiers along which values may optionally be propagated. As introduced above, growing the pixel values may include growing into either "unknown" or "known" pixels. For "unknown" pixels, the body-part/player index value, for example, in one scenario, may have been zero before, but may now have a non-zero neighboring pixel. In such a case, the four direct neighboring pixels may be examined, and the neighboring pixel having an observed depth value more closely resembling that of the pixel of interest may be selected and assigned to the pixel of interest. In the case of "known" pixels, it may be possible that a pixel with a known nonzero body-part/player index value may be overtaken, if one of its neighboring pixels has a depth value written during rasterization that more closely matches the observed depth value of the pixel of interest than that of the synthesized depth value for that pixel.

Additionally, for efficiency, updating a body-part/player index value of a synthesized pixel may include adding its neighboring four pixels to a queue of pixels to be revisited on a subsequent pass. As such, values may continue to be propagated along the frontiers without doing an entire pass over all the pixels. As another optimization, different N×N blocks of pixels (e.g., 16×16 blocks of pixels) occupied by a target of interest can be tracked so that other blocks that are not occupied by a target of interest can be ignored. Such an optimization may be applied at any point during the target analysis after rasterization in various forms.

It is to be noted, however, that grow operations may take a variety of different forms. For example, various flood-fills may first be performed to identify regions of like values, and then it can be decided which regions belong to which body parts. Furthermore, the number of pixels that any body-part/player index object (e.g., left forearm body part bp4 of FIG. 3) can grow may be limited based on how many pixels such an object is expected to occupy (e.g., given its shape, distance and angle) vs. how many pixels in the snap map were assigned that body-part/player index. Additionally, the aforementioned approaches may include adding advantages or disadvantages, for certain poses, to bias the growth for certain body parts so that the growth may be correct.

A progressive snap adjustment can be made to the snap map if it is determined that a distribution of pixels from a body part is grouped at one depth, and another distribution of pixels from the same body part is grouped at another depth, such that a gap exists between these two distributions. For example, an arm waving in front of a torso, and near to that torso, may "spill into" the torso. Such a case may yield a group of torso pixels with a body-part index indicating that they are arm pixels, when in fact they should be torso pixels. By examining the distribution of synthesized depth values in the lower arm, it may be determined that some of the arm pixels may be grouped at one depth, and the rest may be grouped at another depth. The gap between these two groups of depth values indicates a jump between arm pixels and what should be torso pixels. Thus, in response to identifying such a gap, the spillover may then be remedied by assigning torso body-part indices to the spillover pixels. As another example, a progressive snap adjustment can be helpful in an arm-over-background-object case. In this case, a histogram can be used to identify a gap in the observed depth of the pixels of interest (i.e., pixels thought to belong to the arm). Based on such a gap, one or more groups of pixels can be identified as properly belonging to an arm and/or other group(s) can be rejected as background pixels. The histogram can be based on a variety of metrics, such as absolute depth; depth error (synthesized depth—observed depth), etc. The progressive snap adjustment may be performed in-line during rasterization, prior to any grow operations.

At 120, method 100 of FIG. 7 may optionally include creating a height map from the observed depth image, the synthesized depth image, and the body-part/player index maps at the three stages of processing described above. The gradient of such a height map, and/or a blurred version of such a height map, may be utilized when determining the directions of adjustments that are to be made to the model, as described hereafter. The height map is merely an optimization, however; alternatively or additionally, a search in all directions may be performed to identify nearest joints where adjustments may be applied and/or the direction in which such adjustments are to be made. When a height map is used, it may be created before, after, or in parallel to the pixel class determinations described below. When used, the height map is designed to set the player's actual body at a low elevation and the background elements at a high elevation. A watershed-style technique can then be used to trace "downhill" in the height map, to find the nearest point on the player from the background, or vice versa (i.e., seek "uphill" in the height map to find the nearest background pixel to a given player pixel).

The synthesized depth image and the observed depth image may not be identical, and thus the synthesized depth image can use adjustments and or modifications so that it more closely matches an observed depth image and can thus more accurately represent the target. It is to be understood that adjustments can be made to the synthesized depth image by first making adjustments to the model (e.g., change the pose of the model), and then synthesizing the adjusted model into a new version of the synthesized depth image.

A number of different approaches may be taken to modify a synthesized depth image. In one approach, two or more different models may be obtained and rasterized to yield two or more synthesized depth images. Each synthesized depth image may then be compared to the observed depth image by a predetermined set of comparison metrics. The synthesized depth image demonstrating a closest match to the observed depth image may be selected, and this process may be optionally repeated in order to improve the model. When used, this process can be particularly useful for refining the body model to match the player's body type and/or dimensions.

In another approach, the two or more synthesized depth images may be blended via interpolation or extrapolation to yield a blended synthesized depth image. In yet another approach, two or more synthesized depth images may be blended in such a way that the blending techniques and parameters vary across the blended synthesized depth image. For example, if a first synthesized depth image is favorably matched to the observed depth image in one region, and a second synthesized depth image is favorably matched in a second region, the pose selected in the blended synthesized depth image could be a mixture resembling the pose used to create the first synthesized depth image in the first region, and the pose used to create the second synthesized depth image in the second region.

In yet another approach, and as indicated at 122 in FIG. 7, the synthesized depth image may be compared to the observed depth image. Each synthesized pixel of the synthesized depth image may be classified based on the results of the comparison. Such classification may be referred to as determining the pixel case for each pixel. The model used to create the synthesized depth image (e.g., body model 70 of FIG. 3) may be systematically adjusted in accordance with the determined pixel cases.

As described above, one or more pixel cases may be selected for each synthesized pixel based on a comparison to a corresponding pixel of the observed image having a same pixel address as the synthesized pixel. In some embodiments, the selection may be based on one or more factors, which include, but are not limited to—the difference between an observed depth value and a synthesized depth value for that synthesized pixel; the difference between the original body-part index, the (snap) body-part index, and/or the (grow) body/part index for that synthesized pixel; and/or the difference between the original player index, the (snap) player index, and/or the (grow) player index for that synthesized pixel. Accordingly, in some embodiments, the pixel case may be selected from a set of defined pixel cases, as described in more detail with reference to 124-136 of FIG. 7.

Figure 13:
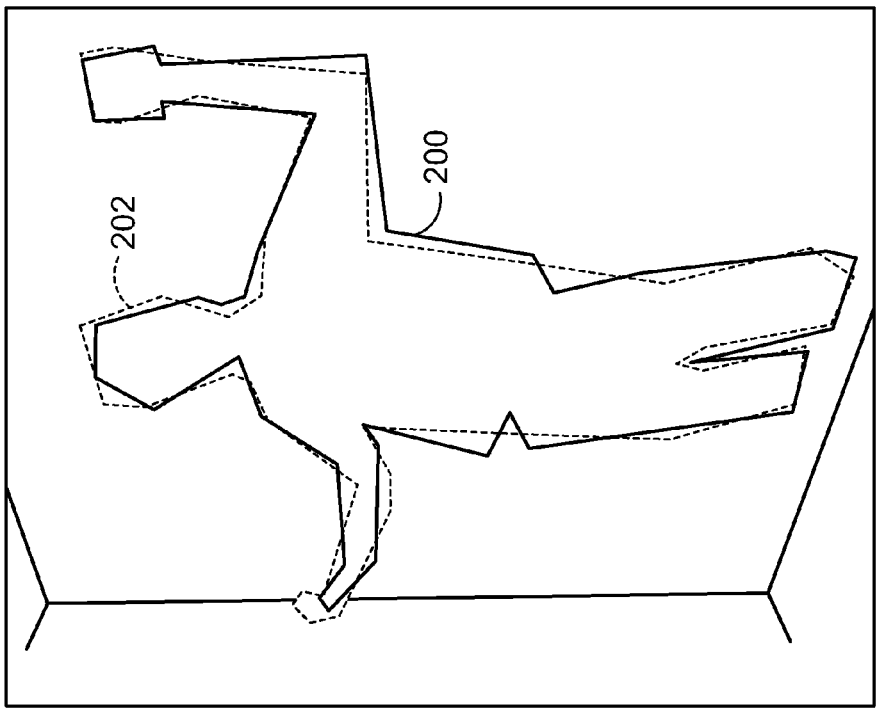
FIG. 13 schematically shows comparing a synthesized depth image to a corresponding observed depth image.

As an example, FIG. 13 shows an example of a synthesized depth image (e.g., synthesized depth image 150 of FIG. 9) analytically compared with a corresponding observed depth image (e.g., observed depth image 140 of FIG. 8), for determining pixel mismatches and thus identifying pixel cases. Synthesized pixels of synthesized depth image 150 corresponding to the model are represented in FIG. 13 by a synthesized silhouette 200 depicted in solid line, and the observed pixels of observed depth image 140 corresponding to the target are represented in FIG. 13 by an observed silhouette 202 depicted in dashed line. It can be appreciated that although such a comparison is schematically depicted as a visual comparison, in practice such a comparison may be an analytical comparison of information corresponding to each pixel address such as depicted at FIG. 10.

Upon comparing each synthesized pixel or group of synthesized pixels with the corresponding observed pixel or group of observed pixels, each synthesized pixel may be associated with a pixel case. For example, for each synthesized pixel, a pixel case may be selected from a set of defined pixel cases such as a refine-z pixel case, a magnetism pixel case, a push pixel case, a pull pixel case, a self-occluding push and/or pull pixel case, etc.

Figure 14:
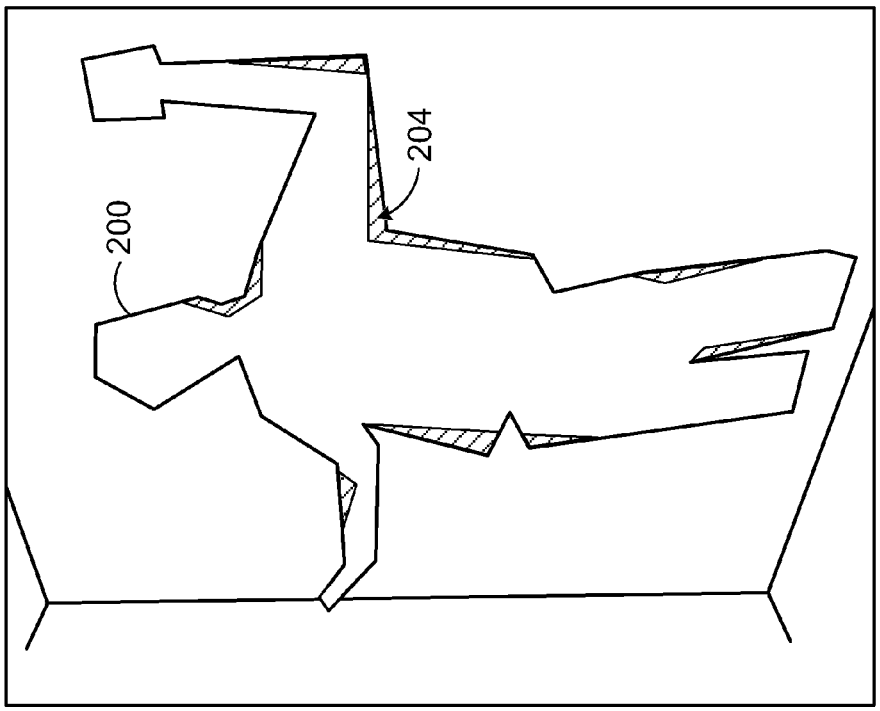
FIG. 14 schematically shows identifying regions of mismatched synthesized pixels of the comparison of FIG. 13.

FIG. 14 shows example regions of synthesized pixels of synthesized silhouette 200 having pixel mismatches (e.g., depth value of observed depth image different than depth value of synthesized image by more than a threshold amount), indicated in diagonal-line shading such as shown at 204. Upon identifying which synthesized pixels of the synthesized depth image are mismatched with respect to those having a same pixel address in the observed image, the model represented in the synthesized depth image may be adjusted so that the model better represents the target.

Figure 15:
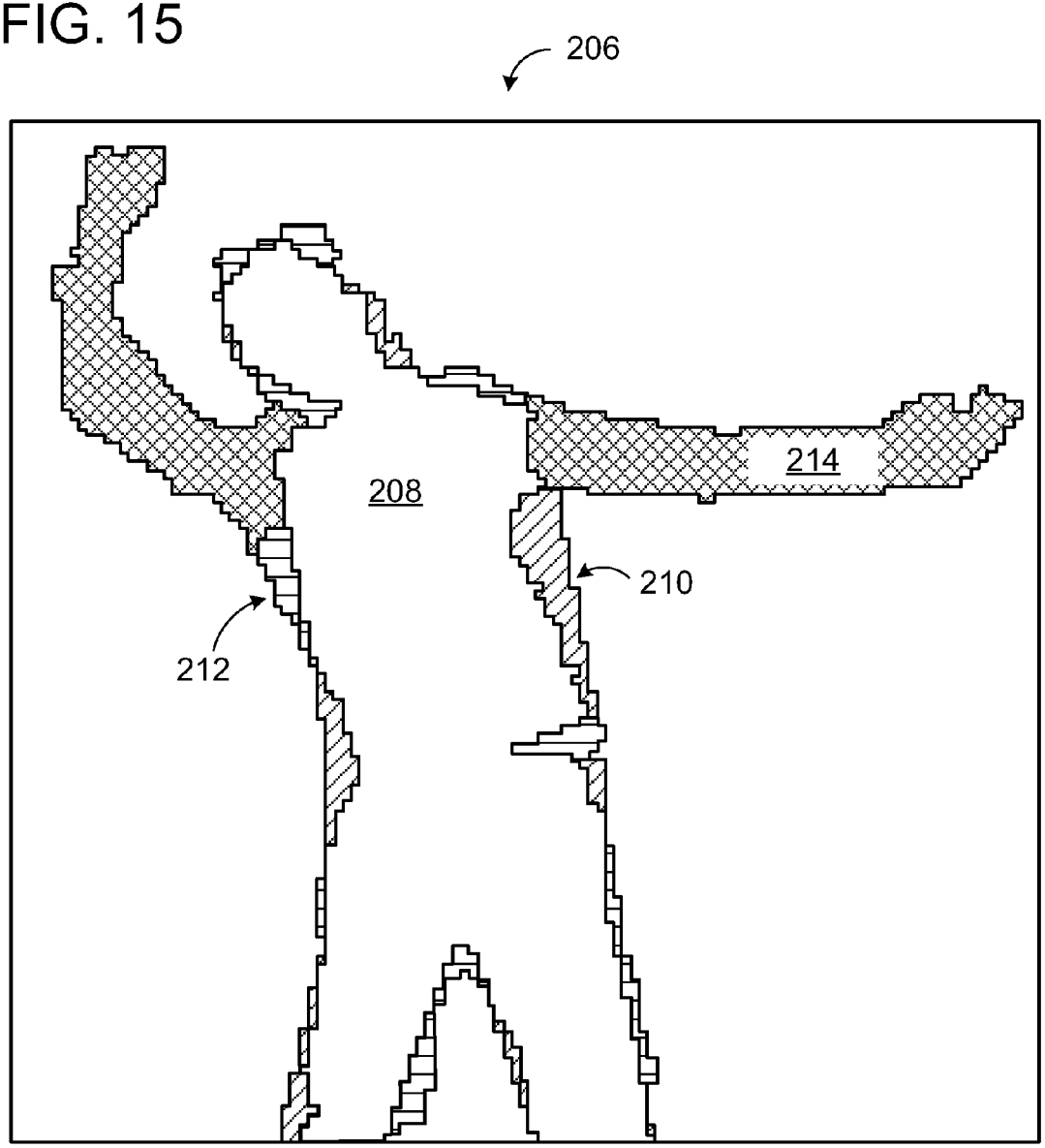
FIG. 15 schematically shows another comparison of a synthesized depth image and a corresponding observed depth image, wherein regions of mismatched pixels correspond to various pixel cases.

FIG. 15 shows another example comparison 206 of a synthesized depth image and a corresponding observed depth image, wherein different pixel cases have been selected for different regions of synthesized pixels. Region 208 includes one or more portions of the model that are shifted forward or backward in a depth direction (i.e., Z-shifted) from a corresponding portion or portions of the observed depth image. As an example, region 208 may correspond to pixels having a refine-z pixel case. The regions identified by diagonal shading, such as example region 210, indicate portions of the model shifted away from a silhouette of the human target in the observed depth image. As an example, region 210 may correspond to pixels having a push pixel case. The regions identified by horizontal shading, such as example region 212, indicate portions of the observed depth image shifted away from a silhouette of the model. As an example, region 212 may correspond to pixels having a pull pixel case. The regions identified by cross-hatch shading, such as example region 214, indicate portions of the model such as arms and/or hands that correspond to pixels having a magnetism pixel case.

Returning to FIG. 7, as described above, for each synthesized pixel, a pixel case may be selected from a set of defined pixel cases such as a refine-z pixel case, a magnetism pixel case, a push pixel case, a pull pixel case, a self-occluding push and/or pull pixel case, etc. Upon doing so, the synthesized pixels of the model having these pixel mismatches may then be corrected by adjusting the model to more closely match the observed image. Such adjustments may be made, for example, by applying forces to the model to reposition the model into a different pose that more closely matches the observed image. In some embodiments, forces may be applied via force vectors having a magnitude and a direction, which may be applied to a force-receiving location of the model, as indicated at 141, 142 and 144 of FIG. 7. The computation and application of each force vector may be based on the pixel case. Such a force vector may be derived from a single pixel address or from a group of two or more related pixel addresses (e.g., neighboring pixel addresses with matching values body-part indices, player indices, etc.). Examples of the pixel cases and associated force vectors are discussed hereafter in more detail.

As indicated at 124 of FIG. 7, determining a pixel case may include selecting a refine-z pixel case. The refine-z pixel case may be selected when the observed depth value of an observed pixel (or in a region of observed pixels) of the observed depth image does not match the synthesized depth value(s) in the synthesized depth image, but is close enough to likely belong to the same object in both images, and the body-part indices match (or, in some cases, correspond to neighboring body parts or regions). A refine-z pixel case may be selected for a synthesized pixel if a difference between an observed depth value and a synthesized depth value for that synthesized pixel is within a predetermined range and, optionally, if that synthesized pixel's (grow) body part index corresponds to a body part that has not been designated for receiving magnetism forces. As another example, a synthesized pixel of interest may be classified with a refine-z pixel case if the synthesized depth value does not match the observed depth value, and an absolute difference between the synthesized depth value and the observed depth value is less than a predetermined threshold.

The refine-z pixel case corresponds to a computed force vector that may exert a force on the model to move the model into the correct position. In other words, a refine-z force vector may be applied to one or more force-receiving locations of the model to move a portion of the model towards a corresponding portion of the observed depth image (e.g., in a direction along the Z axis and perpendicular to an image plane). The computed force vector may be applied along the Z axis perpendicular to the image plane, along a vector normal to an aspect of the model (e.g., face of the corresponding body part), and/or along a vector normal to nearby observed pixels. In some embodiments, the computed force vector may be applied to a combination of a vector normal to the face of the corresponding body part and a vector normal to nearby observed pixels. As nonlimiting examples, such a combination may be an average, a weighted average, a linear interpolation, etc. The magnitude of the force vector is based on the difference in the observed and synthesized depth values, with greater differences corresponding to larger forces. In other words, in some embodiments the force vector may increase in proportion to the absolute difference between the synthesized depth value and the observed depth value. The force-receiving location to which the force is applied can be selected to be the nearest qualifying force-receiving location to the pixel of interest (e.g., nearest torso joint), or the force can be distributed among a weighted blend of the nearest qualifying force-receiving locations. The nearest qualifying force-receiving location may be chosen, however, in some cases, the application of biases can be helpful. For example, if a pixel lies halfway down the upper leg, and it has been established that the hip joint is less mobile (or agile) than the knee, it may be helpful to bias the joint forces for mid-leg pixels to act on the knee rather than the hip. Additional examples of biases are described hereafter.

In some embodiments, the nearest qualifying force-receiving location for a refine-z pixel case may be determined by comparing a distance between the synthesized pixel of interest and each qualifying force-receiving location. The nearest qualifying force-receiving location may be determined, for example, by comparing a distance between the synthesized pixel of interest and each qualifying force-receiving location on a body part that is associated with a body-part index of the synthesized pixel of interest. As another example, the force vector may be one of a plurality of force vectors applied to a weighted blend of nearest qualifying force-receiving locations. Further, the force vector may be biased, for example, towards relatively more mobile qualifying force-receiving locations. For example, application of the force vector may be biased to a less-than-nearest qualifying force-receiving location that is more mobile than the nearest qualifying force-receiving location.

The determination of which force-receiving location is nearest to the pixel of interest (i.e., the synthesized pixel of interest) can be found by a brute-force search, with or without the biases mentioned above. To accelerate the search, the set of force-receiving locations searched may be limited to only those on or near the body part that is associated with the body-part index of this pixel. BSP (binary space partitioning) trees may also be set up, each time the pose is changed, to help accelerate these searches. Each region on the body, or each body part corresponding to a body-part index, may be given its own BSP tree. If so, the biases can be applied differently for each body part, which further enables wise selection of the proper force-receiving locations.

As indicated at 126 of FIG. 7, determining a pixel case may include selecting a magnetism pixel case. The magnetism pixel case may be utilized when the synthesized pixel being examined, in the grow map, corresponds to a predetermined subset of the body parts (e.g., the arms, or bp3, bp4, bp5, bp7, bp8, and bp9 of FIG. 3). While the arms are provided as an example, other body parts, such as the legs or the entire body, may optionally be associated with the magnetism pixel case in some scenarios. Likewise, in some scenarios, the arms may not be associated with the magnetism pixel case.

The pixels marked for the magnetism case may be grouped into regions, each region being associated with a specific body part (such as, in this example, upper left arm, lower left arm, left hand, and so on). For example, a grow operation such as described above may be completed prior to the processing of magnetism pixels. During the grow operation, each pixel may be "tagged" with the body part of the target which most likely corresponds to that pixel. However, it is possible that one or more pixels may be tagged with the wrong body part (i.e., mis-tagged) during the grow operation. As an example, during fast movement of the arms and/or hands, a motion predictor may not be capable of completing a prediction, and as a result, fast-moving hand pixels may not be added into the snap map, whereas slower upper-arm pixels near the shoulder may still be added to the snap map. In such a case, limb pixels further from the shoulder may have relatively more error in the assignment of body-part indices. In the case that such pixels are mis-tagged, lower-arm pixels may grow down into the hand area during the grow operation. As another example, if neither lower-arm pixels nor hand pixels were added into the snap map, then upper-arm pixels added to the snap map may be grown down into the lower-arm and the hand areas. As a result, for example, pixels corresponding to the hand of the human target may be labeled as "lower-arm" or all the arm pixels may be labeled "upper-arm." Therefore, it may be useful to discard this information when processing magnetism, described in more detail as follows.

Although the grow operation may incorrectly identify which part of the limb the pixels belong to, the original body-part assigned to the pixels identifying the limb itself tends to be of higher confidence. In other words, although a lower arm pixel may be incorrectly associated with an upper arm, the fact that the pixel corresponds to some part of the arm is still correct. Accordingly, the subset classification assigned during the grow operation may be dropped. As such, magnetism pixels may be grouped into broader classes (i.e. "pools"), such as "left arm," "right arm" and "other." The pixels in the left arm and right arm pools may then be marked as belonging to the magnetism pixel case. The above is a nonlimiting example, and other methods of identifying arm pixels or other pixels belonging to agile body parts may be used.

For each pixel marked for the magnetism pixel case (e.g., a pixel of the left arm pool), the pixel's location may be converted from a screen-space location, having an X, Y pixel position and a depth value, to a world-space location having coordinates identifying the location in a three-dimensional space. It can be appreciated that this is just one embodiment for processing pixels. In other embodiments, the pixel's screen-space location may not be converted to a world-space location.

Continuing with the processing of each of the left arm and right arm magnetism pixels, the pixel may be projected onto the "bones" that make up the arm of the model and are represented as line segments. As with all pixel cases, the pixel may be projected onto a current, best-guess version of the bone. This best-guess version of the bone may come from the previous frame's final pose, with or without momentum; or it may be updated with any adjustments made during the current frame (e.g., run refine-z pixel case to adjust bone, and then use adjusted bone for magnetism pixels). In other words, joints may be progressively updated at any point during the processing of a frame, and the updated joints may be used for subsequent processing in the current or subsequent frames.

As an example of magnetism processing, the arm may comprise three bone segments, namely an upper arm bone, a lower arm bone, and a hand. For each pixel, a point on the finite line segment that is closest to the pixel may be analytically determined. In some embodiments, this may include comparing pixels against three-dimensional joint positions that are pulled forward in the Z-direction by the estimated radius of the limb at that joint, so that the comparison is of two surface values rather than of a surface value and an internal value.

The pixel may then be assigned to that closest line segment. In some embodiments, the pixel may be assigned to a different line segment if it is determined that the closest line segment may be incorrect. For example, if the target's arm is outstretched but the model's arm is in a "chicken-wing" position, a pixel that is sufficiently far from the shoulder (e.g., 1.5 times the length of the upper arm) may have the closest line segment overridden to be the lower-arm bone. Upon determining which bone the pixel may be associated with, the pixel's location may be added to the "near" and "far" centroids of that bone, described in more detail as follows.

For each of the magnetism regions, centroids of the pixels belonging to the region may be computed. These centroids can be either orthodox (all contributing pixels are weighted equally), or biased, where some pixels carry more weight than others. For example, for the upper arm, three centroids may be tracked: 1) an unbiased centroid, 2) a "near" centroid, whose contributing pixels are weighted more heavily when they are closer to the shoulder; and 3) a "far" centroid, whose contributing pixels are weighted more heavily when closer to the elbow. These weightings may be linear (e.g., 2X) or nonlinear (e.g., $x^2$) or follow any curve.

Once these centroids are computed, a variety of options are available (and can be chosen dynamically) for computing the position and orientation of the body part of interest, even if some are partially occluded. For example, when trying to determine the new position for the elbow, if the centroid in that area is sufficiently visible (if the sum of the weights of the contributing pixels exceeds a predetermined threshold), then the centroid itself marks the elbow (estimate #1). However, if the elbow area is not visible (perhaps because it is occluded by some other object or body part), the elbow location can still often be determined, as described in the following nonlimiting example. If the far centroid of the upper arm is visible, then a projection can be made out from the shoulder, through this centroid, by the length of the upper arm, to obtain a very likely position for the elbow (estimate #2). If the near centroid of the lower arm is visible, then a projection can be made up from the wrist, through this centroid, by the length of the lower arm, to obtain a very likely position for the elbow (estimate #3).

A selection of one of the three potential estimates can be made, or a blend between the three potential estimates may be made, giving priority (or higher weight) to the estimates that have higher visibility, confidence, pixel counts, or any number of other metrics. Finally, in this example, a single magnetism force vector may be applied to the model at the location of the elbow; however, it may be more heavily weighted (when accumulated with the pixel force vectors resulting from other pixel cases, but acting on this same force-receiving location), to represent the fact that many pixels were used to construct it. When applied, the computed magnetism force vector may move the model so that the corresponding model more favorably matches the target shown in the observed image. An advantage of the magnetism pixel case is its ability to work well with highly agile body parts, such as arms.

In some embodiments, a model without defined joints or body parts may be adjusted using only the magnetism pixel case.

Figure 16:
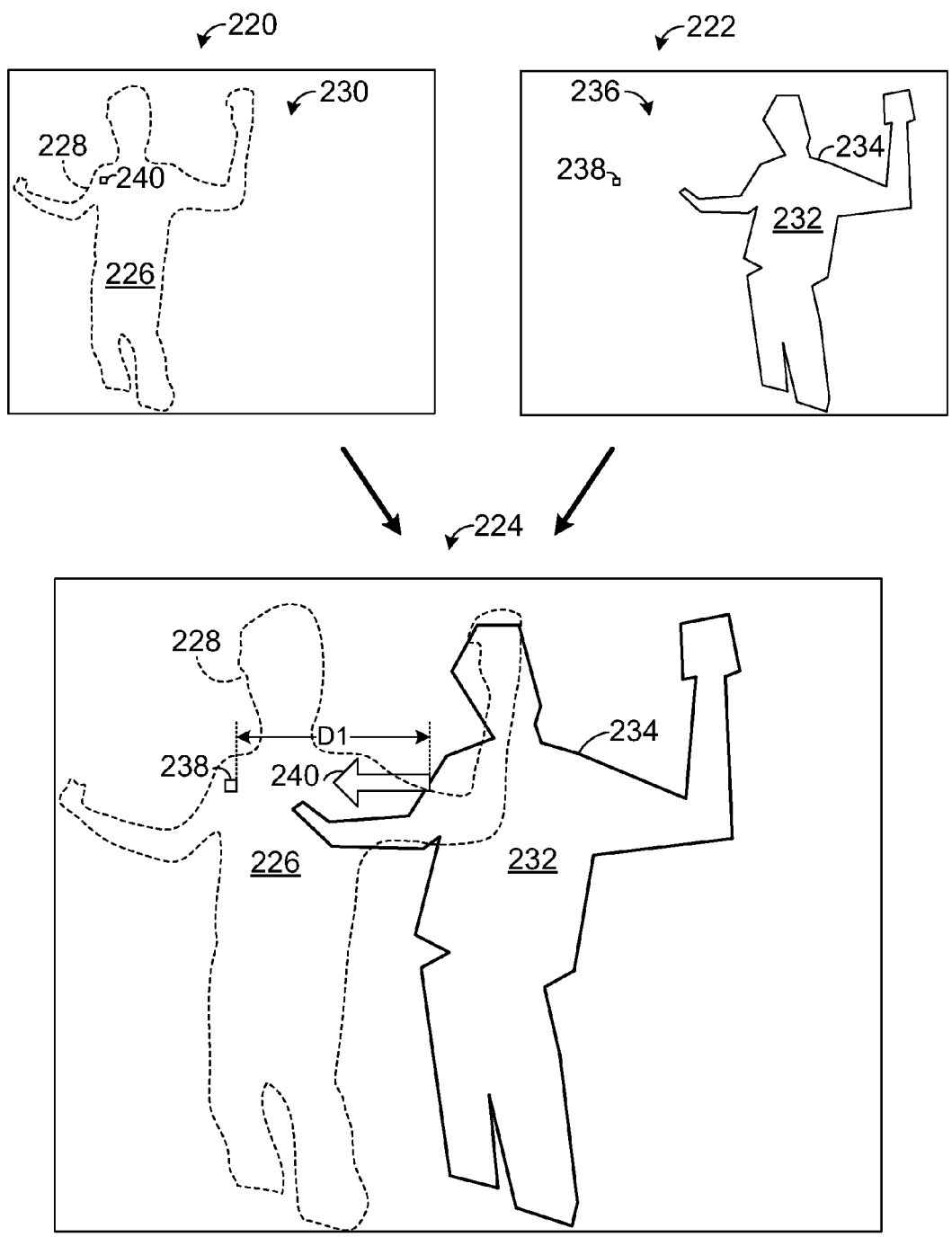
FIG. 16 schematically shows an example embodiment of a pull pixel case.

As indicated at 128 and at 130 of FIG. 7, determining a pixel case may include selecting a push pixel case and/or a pull pixel case. These pixel cases may be invoked at the silhouette, where the synthesized and observed depth values may be severely mismatched at the same pixel address. It is noted that the pull pixel case and the push pixel case can also be used when the original player index does not match the (grow) player index. The determination of push vs. pull is as follows. If the synthesized depth image contains a depth value that is greater than (farther than) the depth value in the observed depth image at that same pixel address, for example by more than a threshold amount, then the model can be pulled toward the true silhouette seen in the grown image. In other words, for portions of the observed depth image shifted away from a silhouette of the model, the model may be pulled in an XY plane towards the silhouette of the target in the observed depth image. As an example, pull force vectors applied to one or more force-receiving locations of the model may be used to "pull" the model. FIG. 16 illustrates an example of such a pull pixel case, and is described in more detail as follows.

FIG. 16 schematically illustrates an example observed depth image 220 compared with an example synthesized depth image 222, as indicated at 224. As such, the pixel addresses of synthesized depth image 222 correspond to those of observed depth image 220. To more clearly illustrate the example, FIG. 16 depicts an exaggerated example where observed depth image 220 and synthesized depth image 222 are clearly mismatched. However, it can be appreciated that in practice the two images may only be mismatched by a relatively small amount and mismatches as severe as that illustrated may be difficult to resolve.

Observed depth image 220 includes an image of an observed human target (i.e., game player), namely, player image 226, wherein the player image 226 has a silhouette, namely player silhouette 228, such that pixels inside player silhouette 228 are pixels of the player image 226 and pixels outside of player silhouette 228 are pixels of the observed background 230. Similarly, synthesized depth image 222 includes a model 232 representing the observed game player, wherein the model 232 has a silhouette, namely model silhouette 234, such that pixels inside model silhouette 234 are pixels of the model 232 and pixels outside of model silhouette 234 are pixels of the synthesized background 236.

Upon comparing synthesized depth image 222 with observed depth image 220, it becomes more apparent that a mismatch exists, such that pixels at a same pixel address correspond to different parts of each depth image. For example, an example pixel is selected for discussion, namely synthesized pixel of interest 238. As shown, synthesized pixel of interest 238 corresponds to synthesized background 236 of synthesized depth image 222. However, a same pixel address in the corresponding observed depth image corresponds to an observed pixel 240 associated with the player image 226. In this particular example, synthesized pixel of interest 238 has a greater depth value than that of the corresponding observed pixel 240 since the background is at greater depth (i.e., farther from the depth camera) than the game player. As such, model 232 may be pulled toward the synthesized pixel of interest 238 (i.e., toward player silhouette 228) as indicated by arrow 240.

Figure 17:
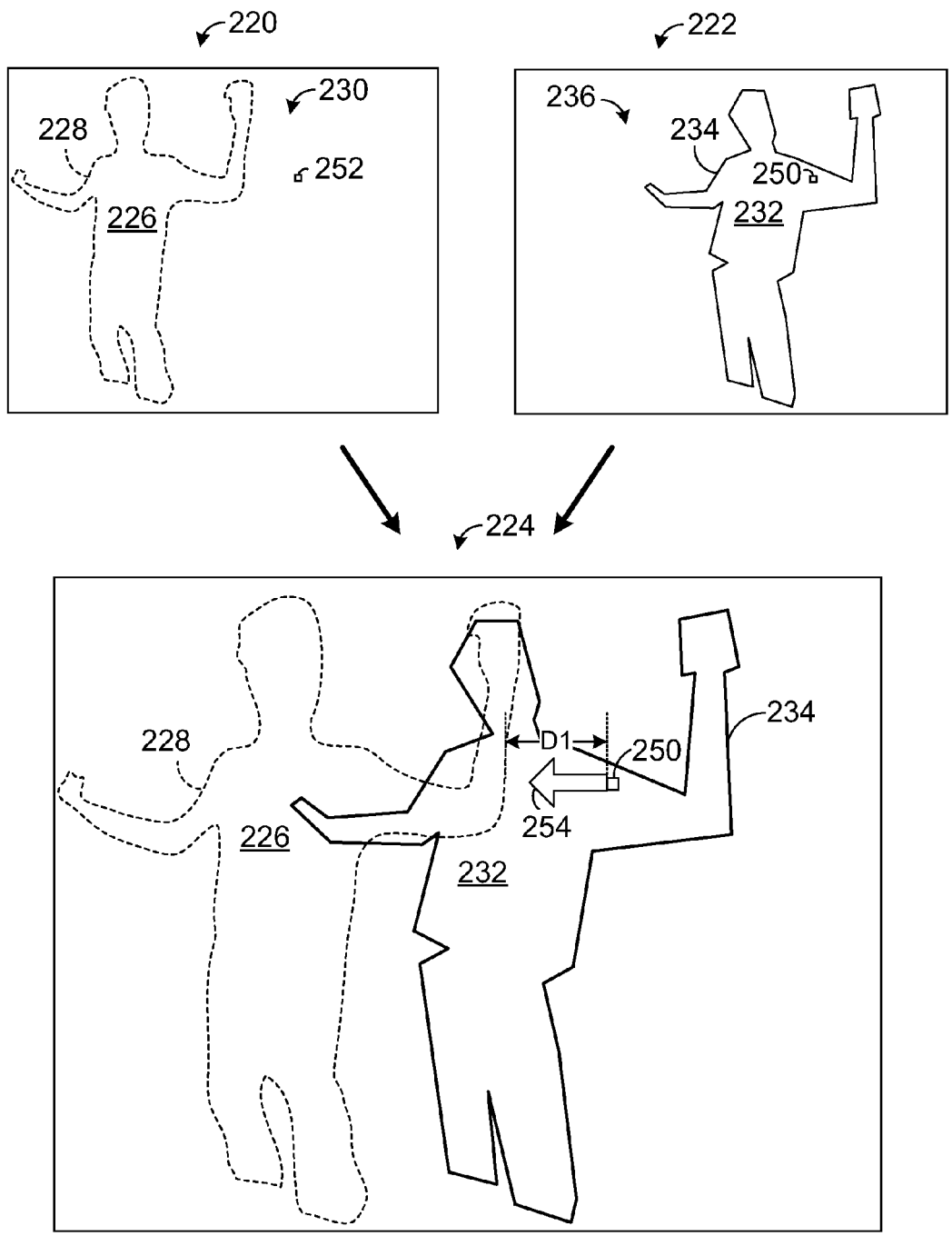
FIG. 17 schematically shows an example embodiment of a push pixel case.

Conversely, if the original synthesized image contains a depth value that is less than (closer than) the depth value in the observed depth image, for example by more than a threshold amount, then the model can be pushed out of the space that the player no longer occupies (and toward the real silhouette in the grown image). In other words, for portions of the model shifted away from a silhouette of the human target in the observed depth image, the model may be pushed in an XY plane towards the silhouette of the human target in the observed depth image. As an example, push force vectors applied to one or more force-receiving locations of the model may be used to "push" the model. FIG. 17 illustrates an example of such a push pixel case, and is described in more detail as follows.

FIG. 17 schematically illustrates a comparison similar to that shown in FIG. 16, namely a comparison of synthesized depth image 222 and observed depth image 220. However, for the example illustrated in FIG. 17, a different synthesized pixel of interest is examined, namely synthesized pixel of interest 250. Synthesized pixel of interest 250 corresponds to model 232 of synthesized depth image 222, whereas at a same pixel address in the corresponding observed depth image 220, observed pixel 252 is associated with observed background 230. In this particular example, synthesized pixel of interest 250 has a lesser depth value than that of the corresponding observed pixel 252 since the model is at a lesser depth (i.e. closer to the depth camera) than the background. As such, model 222 may be pushed away from the synthesized pixel of interest 250 (i.e. toward player silhouette 228) as indicated by arrow 254.

In either case, (e.g., the pull pixel case of FIG. 16 or the push pixel case of FIG. 17) for each of these pixels or pixel regions, a two- or three-dimensional computed force vector may be exerted on the model to correct the silhouette mismatch, either pushing or pulling parts of the body model into a position that more accurately matches the position of the target in the observed depth image. The direction of such pushing and/or pulling is often predominantly in the XY plane, although a Z component can be added to the force in some scenarios. Accordingly, in some cases the push force vectors and/or the pull force vectors may be three-dimensional vectors including Z-components.

For example, for the pull case illustrated in FIG. 16, a pull force vector may be applied to a force-receiving location of model 232 to pull model 232 toward the player silhouette 228 in the observed depth image. A magnitude of the pull force vector may be proportional to a pull-offset distance with which a portion of the observed depth image is shifted away from the silhouette of the model. In other words, a pull-offset distance D1 may be defined as a distance between the synthesized pixel of interest (e.g., pixel 238) and a nearest qualifying pixel of model silhouette 234. As such, the magnitude of the pull force vector, D2, may be a function of the pull-offset distance D1, as described in more detail hereafter. Further, a direction of the pull force vector may be parallel to a vector extending from the nearest qualifying pixel on model silhouette 234 to the synthesized pixel of interest 238.

For the push case illustrated in FIG. 17, a push force vector may be applied to a force-receiving location of model 232 to push model 232 towards the player silhouette 228 in the observed depth image 220. A magnitude of the push force vector may be proportional to a push-offset distance with which a portion of the model is shifted away from the player silhouette 228. In other words, a push-offset distance D1 may be defined as a distance between the synthesized pixel of interest, (e.g., pixel 250), and a nearest qualifying pixel of player silhouette 228. In some embodiments, the magnitude of the push force vector, D2, may be a function of the push-offset distance D1 as described in more detail hereafter. Further, a direction of the push force vector may be parallel to a vector extending from the synthesized pixel of interest 250 to the nearest qualifying pixel on the player silhouette 228.

In order to produce the proper force vector for a pull or push case, the nearest qualifying point on either the player silhouette in the synthesized depth image (i.e., model silhouette) (for a pull case), or on the player silhouette in the observed depth image (for a push case) may first be found. This point can be found, for each source pixel (or for each group of source pixels), by performing a brute-force, exhaustive 2D search for the nearest point (on the desired silhouette) that meets the following criteria. In the pull pixel case, the closest pixel with a player index in the original map (at the seek position) that matches the player index in the grown map (at the source pixel or region) is found. In the push pixel case, the closest pixel with a player index in the grown map (at the seek position) that matches the player index in the original map (at the source pixel or region) is found.

However, a brute force search can be very computationally expensive, and optimizations can be used to reduce computational expense. One non-limiting example optimization for finding this point more efficiently is to follow the gradient of the above described height map, or a blurred version thereof, and to only examine pixels in a straight line, in the direction of the gradient. In this height map, the height values are low where the player index is the same in both the original and grown player index maps, and the height values are high where the player index (in both maps) is zero. The gradient can be defined as the vector, at any given pixel, pointing "downhill" in this height map. Both pull and push pixels can then seek along this gradient (downhill) until they reach their respective stopping condition, as described above. As such, a nearest qualifying pixel on the model silhouette 234 and/or a nearest qualifying pixel on the player silhouette 228 may be found using a one dimensional search along the gradient of the blurred height map. Further, the nearest qualifying pixel on the model silhouette 234 may be found by testing model silhouette pixels near the silhouette pixel found using the one dimensional search. Likewise, the nearest qualifying pixel on the player silhouette 228 may be found by testing player silhouette pixels near the silhouette pixel found using the one dimensional search.

Other basic optimizations for this seek operation include skipping pixels, using interval halving, or using a slope-based approach; re-sampling the gradient, at intervals, as the seek progresses; as well as checking nearby for better/closer matches (not directly along the gradient) once the stopping criteria are met. Some search strategies may choose the nearest qualifying pixel from a subset of candidate pixels satisfying one or more selection criteria, such as pixels having a certain body-part index.

No matter what technique is used to find the nearest point on the silhouette of interest, the distance traveled (the distance between the source pixel and the silhouette pixel), D1, may be used to calculate the magnitude (length), D2, of the force vector that will push or pull the model. In some embodiments, D2 may be linearly or nonlinearly related to D1 (e.g., D2=2*D1 or D2=D1$^2$). As one nonlimiting example, the following formula can be used: D2=(D1−0.5 pixels)*2. As described above, D1 may either a pull-offset distance or a push-offset distance. Accordingly, D2 may be a magnitude of a pull force vector or a push force vector, respectively. The pull-offset distance and/or a push-offset distance may be found using the one dimensional search along the gradient of the blurred height map as described above.

For example, if there is a 5-pixel gap between the silhouette in the two depth images, each pixel in this gap may perform a small "seek" and produce a force vector. The pixels near the real silhouette may seek by only 1 pixel to reach the silhouette, so the force magnitude at those pixels will be (1−0.5)* 2=1. The pixels far from the real silhouette may seek by 5 pixels, so the force magnitude will be (5−0.5)*2=9. In general, going from the pixels closest to the real silhouette to those farthest, the seek distances will be D1={1, 2, 3, 4, 5} and the force magnitudes produced will be: D2={1, 3, 5, 7, 9}. The average of D2 in this case is 5, as desired—the average magnitudes of the resulting force vectors are equivalent to the distance between the silhouettes (near each force-receiving location), which is the distance that the model can be moved to put the model in the proper place.

The final force vector, for each source pixel, may then be constructed with a direction and a magnitude (i.e., length). For pull pixels, the direction is determined by the vector from the silhouette pixel to the source pixel; for push pixels, it is the opposite vector. The length of this force vector is D2. At each pixel, then, the force may be applied to a best-qualifying (e.g., nearest) force-receiving location (or distributed between several), and these forces can be averaged, at each force-receiving location, to produce the proper localized movements of the body model. Although not shown in FIGS. 16-17, in some embodiments, the force-receiving location may be a joint of the model.

As indicated at 132 and at 134 of FIG. 7, determining a pixel case may include selecting a self-occluding push and/or pull pixel case. Whereas in the above-mentioned push and pull pixel cases a body part may be moving in the foreground relative to a background or another target, the self-occluding push and pull pixel cases consider the scenarios where the body part is in front of another body part of the same target (e.g., one leg in front of another, arm in front of torso, etc.). These cases may be identified when the pixel's (snap) player index matches its corresponding (grow) player index, but when the (snap) body-part index does not match its corresponding (grow) body-part index. In such cases, the seek direction (to find the silhouette) may be derived in several ways. As nonlimiting examples, a brute-force 2D search may be performed; a second set of "occlusion" height maps may be tailored for this case so that a gradient can guide a 1D search; or the direction may be set toward the nearest point on the nearest skeletal member. Details for these two cases are otherwise similar to the standard pull and push cases.

Push, pull, self-occluding push, and/or self-occluding pull pixel cases may be selected for a synthesized pixel if that synthesized pixel's (grow) body part index corresponds to a body part that has not been designated for receiving magnetism forces.

It is to be understood that in some scenarios a single pixel may be responsible for one or more pixel cases. As a nonlimiting example, a pixel may be responsible for both a self-occluding push pixel force and a refine-z pixel force, where the self-occluding push pixel force is applied to a force-receiving location on the occluding body part and the refine-z pixel force is applied to a force-receiving location on the body part being occluded.

As indicated at 136 of FIG. 7, determining a pixel case may include selecting no pixel case for a synthesized pixel. Oftentimes a force vector will not need to be calculated for all synthesized pixels of the synthesized depth image. For example, synthesized pixels that are farther away from the body model shown in the synthesized depth image, and observed pixels that are farther away from the target shown in the observed depth image (i.e., background pixels), may not influence any force-receiving locations or body parts. A pixel case need not be determined for such pixels, although it can be in some scenarios. As another example, a difference between an observed depth value and a synthesized depth value for that synthesized pixel may be below a predetermined threshold value (e.g., the model already matches the observed image). As such, a pixel case need not be determined for such pixels, although it can be in some scenarios.

At 141, method 100 of FIG. 7 includes, for each synthesized pixel for which a pixel case has been determined, computing a force vector based on the pixel case selected for that synthesized pixel. As described above, each pixel case corresponds to a different algorithm and/or methodology for selecting the magnitude, direction, and/or force-receiving location of a force vector. In particular, a force vector (magnitude and direction) may be calculated for each synthesized pixel based on the determined pixel case and, depending on the type of model, the computed force vector can be applied to a nearest qualifying joint, a centroid of a body part, a point on a body part, a vertex of a triangle, or another predetermined force-receiving location of the model used to generate the synthesized depth image. In some embodiments, the force attributed to a given pixel can be distributed between two or more force-receiving locations on the model.

The force vectors may be computed and/or accumulated in any coordinate space, such as world space, screen space (pre-Z-divide), projection space (post-Z-divide), model space, and the like. For example, as described above for the push and/or pull pixel case, a magnitude of the push and/or pull force vector may be proportional to a push-offset distance and/or pull-offset distance, respectively. For the refine-z pixel case, a magnitude of the refine-z force vector may be based on the absolute difference between the synthesized depth value and the observed depth value, such that the refine-z force vector increases in proportion to that absolute difference. For the magnetism case, the force vector may depend on a synthesized pixel's proximity to a bone segment, as well as the centroids of the corresponding limb.

At 142, method 100 includes mapping each computed force vector to one or more force-receiving locations of the model. Mapping may include mapping a computed force vector to a "best-matching" force-receiving location. The selection of a best-matching force-receiving location of the model is dependent on the pixel case selected for the corresponding pixel. The best-matching force-receiving location may be the nearest joint, vertex, or centroid, for example. In some embodiments, moments (i.e., rotational forces) may be applied to a model.

In some cases, a single pixel may be responsible for two or more different force vectors. As a nonlimiting example, a pixel may be identified as a limb pixel occluding the torso after the snap operation, but the same pixel may then be identified as a torso pixel after the grow operation (i.e., the limb has moved from that pixel address). In such a case, the pixel may be responsible for a push force to the limb to push the limb out of the way and a refine-z force to the torso to move the torso to the proper depth. As another example, two or more pixel forces may result from a single pixel if the pixel lies between two or more joints. For example, a mid-calf pixel may move both the ankle and the knee.

In general, at each pixel address, combinations of the original player index, snap player index, grow player index, original body-part index, snap body-part index, grow body-part index, synthesized depth value, snap depth value, observed depth value, and/or other observed or synthesized data for a given pixel address may be used to determine one or more pixel cases for that pixel address.

FIG. 18 shows a table detailing an example relationship between the pixel cases described above and the joints illustrated in skeletal model 82 of FIG. 5 to which the force vectors may be mapped. Pixel cases 1-7 are abbreviated in the table as follows: 1—Pull (regular), 2—Pull (occlusion), 3—Push (regular), 4—Push (occlusion), 5—Refine-Z, 6—Magnetic Pull, and 7—Occlusion (no action). A "Yes" entry in the "Receives Forces?" column indicates that the joint of that row may receive forces from a force vector. An "X" entry in a pixel cases column denotes that the joint of that row may receive a force from a force vector corresponding to the pixel case of that column. It is to be understood that the table is provided as an example. It is not to be considered limiting. Other relationships between models and pixel cases may be established without departing from the scope of this disclosure.

In general, translations may result from forces with similar directions acting on the force-receiving locations of a model, and rotations may result from forces of different directions acting on the force-receiving locations of a model. For deformable objects, some of the components of the force vectors may be used to deform the model within its deformation limits, and the remaining components of the force vectors may be used to translate and/or rotate the model.

In some embodiments, force vectors may be mapped to the best-matching rigid or deformable object, sub-object, and/or set of polygons of an object. Accordingly, some of the force vectors may be used to deform the model, and the remaining components of the force vectors may be used to perform rigid translation of the model. Such a technique may result in a "broken" model (e.g., an arm could be severed from the body). As discussed in more detail below, a rectification step may then be used to transform translations into rotations and/or apply constraints in order to connect body parts back together along a low-energy path.

Further, in some embodiments, 142 of method 100 includes mapping more than one force vector. For example, a first synthesized pixel having a body-part index corresponding to an arm of the human target may have been classified with a first pixel case, and a second synthesized pixel having a body-part index corresponding to a torso of the human target may have been classified with a second pixel case. In such a case, a first force vector for the first synthesized pixel may be computed in accordance with the first pixel case, and a second force vector for the second synthesized pixel may be computed in accordance with the second pixel case. Accordingly, the first force vector may be mapped to a first force-receiving location of the model, where the first force-receiving location corresponds to the arm of the human target. Additionally, the second force vector may be mapped to a second force-receiving location of the model, where the second force-receiving location corresponds to the torso of the human target.

Figure 11B:
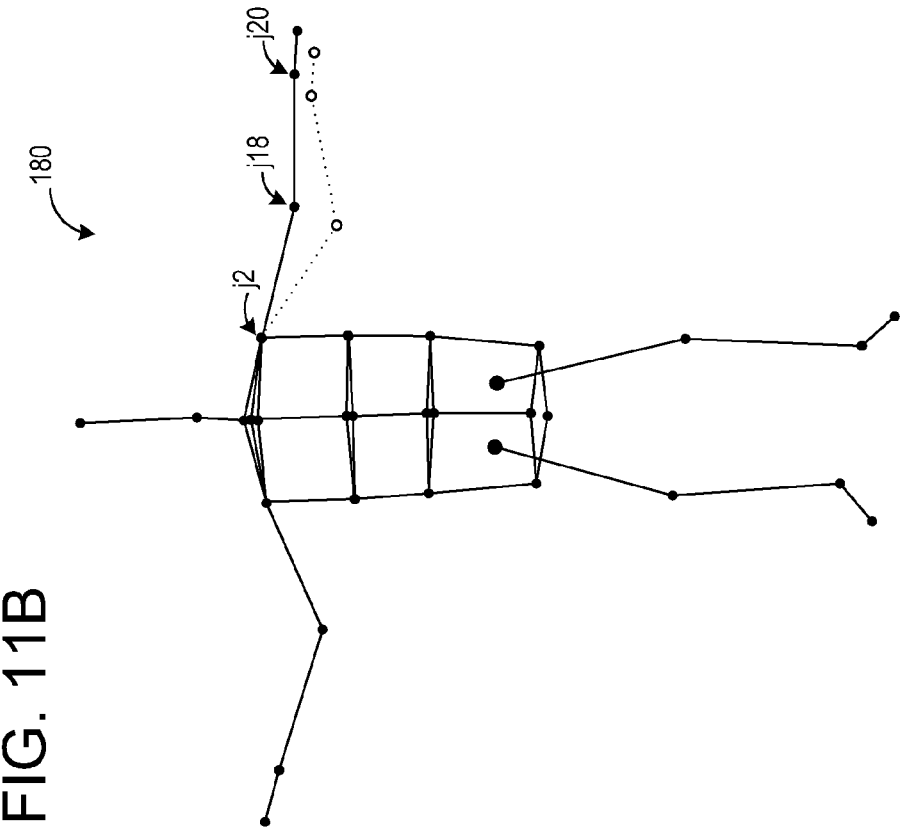
FIG. 11B schematically shows a result of applying the force to the force-receiving location of the model of FIG. 11A.
Figure 11A:
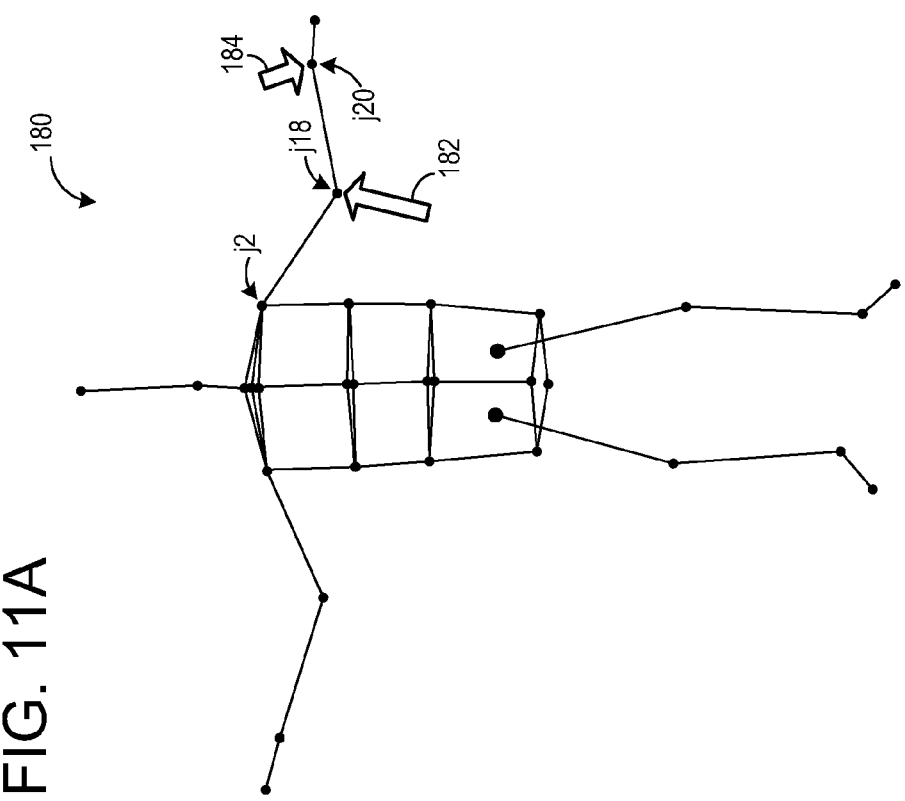
FIG. 11A schematically shows the application of a force to a force-receiving location of a model.

FIGS. 11A and 11B show a very simplified example of applying force vectors to a model—in the illustrated example, a skeletal model 180. For the sake of simplicity, only two force vectors are shown in the illustrated example. Each such force vector may be the result of the summation of two or more different force vectors resulting from the pixel case determinations and force vector calculations of two or more different pixels. Often times, a model will be adjusted by many different force vectors, each of which is the sum of many different force vectors resulting from the pixel case determinations and force vector calculations of many different pixels.

FIG. 11A shows a skeletal model 180, where force vector 182 is to be applied to joint j18 (i.e., an elbow) and force vector 184 is to be applied to joint j20 (i.e., a wrist), for the purpose of straightening one arm of skeletal model 180 to more closely match an observed depth image. FIG. 11B shows skeletal model 180 after the forces are applied. FIG. 11B illustrates how the applied forces adjust the pose of the model. As shown in FIG. 11B, the lengths of the skeletal members may be preserved. As further shown, the position of joint j2 remains at the shoulder of the skeletal model, as expected for the case of a human straightening their arm. In other words, the skeletal model remains intact after the forces have been applied. Maintaining the integrity of the skeletal model when applying forces results from one or more constraints being applied, as discussed in more detail hereafter. A variety of different constraints can be enforced to maintain the integrity of different possible model types.

At 144, method 100 of FIG. 7 optionally includes rectifying the model to a pose satisfying one or more constraints. As described above, after collecting and mapping the computed force vectors to the force-receiving locations of the model, the computed force vectors may then be applied to the model. If performed without constraint, this may "break" the model, stretching it out of proportion and/or moving body parts into invalid configurations for the actual body of the target. Iterations of various functions may then be used to "relax" the new model position into a "nearby" legal configuration. During each iteration of rectifying the model, constraints may be gently and/or gradually applied to the pose, in order to limit the set of poses to those that are physically expressible by one or more actual bodies of one or more targets. In other embodiments, such a rectifying step may be done in a non-iterative manner.

In some embodiments, the constraints may include one or more of: skeletal member length constraints, joint angle constraints, polygon edge angle constraints, and collision tests, as described hereafter.

As an example in which a skeletal model is used, skeletal member (i.e., bone) length constraints can be applied. Force vectors that can be detected (i.e., force vectors at locations where joints and/or body parts are visible and not occluded) may be propagated along a network of skeletal members of the skeletal model. By applying skeletal member length constraints, the propagated forces may "settle in" once all of the skeletal members are of acceptable lengths. In some embodiments, one or more of the skeletal member lengths are allowed to be variable within a predetermined range. For example, the length of skeletal members making up the sides of the torso may be variable to simulate a deformable midsection. As another example, the length of skeletal members making up the upper-arm may be variable to simulate a complex shoulder socket.

A skeletal model may additionally or alternatively be constrained by computing a length of each skeletal member based on the target, such that these lengths may be used as constraints during rectification. For example, the desired bone lengths are known from the body model; and the difference between the current bone lengths (i.e., distances between new joint positions) and the desired bone lengths can be assessed. The model can be adjusted to decrease any error between desired lengths and current lengths. Priority may be given to certain joints and/or bones that are deemed more important, as well as joints or body parts that are currently more visible than others. Also, high-magnitude changes may be given priority over low-magnitude changes.

As an example, FIG. 19 illustrates application of one or more constraints to a model representing the target. It can be appreciated that although FIG. 19 provides a visual illustration, in practice, application of the constraints may be analytical, and may include, for example, modifying pixel data such as that illustrated in FIG. 10. For the example depicted in FIG. 19, application of a force vector to model 260 may result in a "broken" model. For example, the target may reposition itself to have an arm raised overhead. In tracking that motion, a force vector may be applied to one or more force-receiving locations of the arm to mimic the motion of the target. However, doing so could potentially result in "breaking" the arm, such as depicted at 262, and/or changing the proportions of the arm, such as shown at 264. Since the model represents a human target in this example, both of these scenarios are not physically possible with a human arm. Accordingly, constraints may be applied to ensure that adjustments to the model are physically appropriate. For example, a constraint may be applied, such as shown at 266, to ensure that the forearm and upper arm remain attached at the elbow. As another example, a bone-length constraint may be applied to the forearm, such as shown at 268, to ensure that the forearm remains approximately the same length. Upon application of the constraints, such as shown at 270, the model maintains its physical integrity.

Joint visibility and/or confidence may be separately tracked in the X, Y, and Z dimensions to allow more accurate application of bone length constraints. For example, if a bone connects the chest to the left shoulder, and the chest joint's Z position is high-confidence (i.e., many refine-z pixels correspond to the joint) and the shoulder's Y-position is high-confidence (many push/pull pixels correspond to the joint), then any error in the bone length may be corrected while partially or fully limiting movement of the shoulder in the Y direction or the chest in the Z direction.

In some embodiments, joint positions prior to rectification may be compared to joint positions after rectification. If it is determined that a consistent set of adjustments is being made to the skeletal model in every frame, method 100 may use this information to perform a "progressive refinement" on the skeletal and/or body model. For example, by comparing joint positions before and after rectification it may be determined that in each frame the shoulders are being pushed wider apart during rectification. Such a consistent adjustment suggests that the shoulders of the skeletal model are smaller than that of the target being represented, and consequently, the shoulder width is being adjusted each frame during rectification to correct for this. In such a case, a progressive refinement, such as increasing the shoulder width of the skeletal model, may be made to correct the skeletal and/or body model to better match the target.

Figure 20:
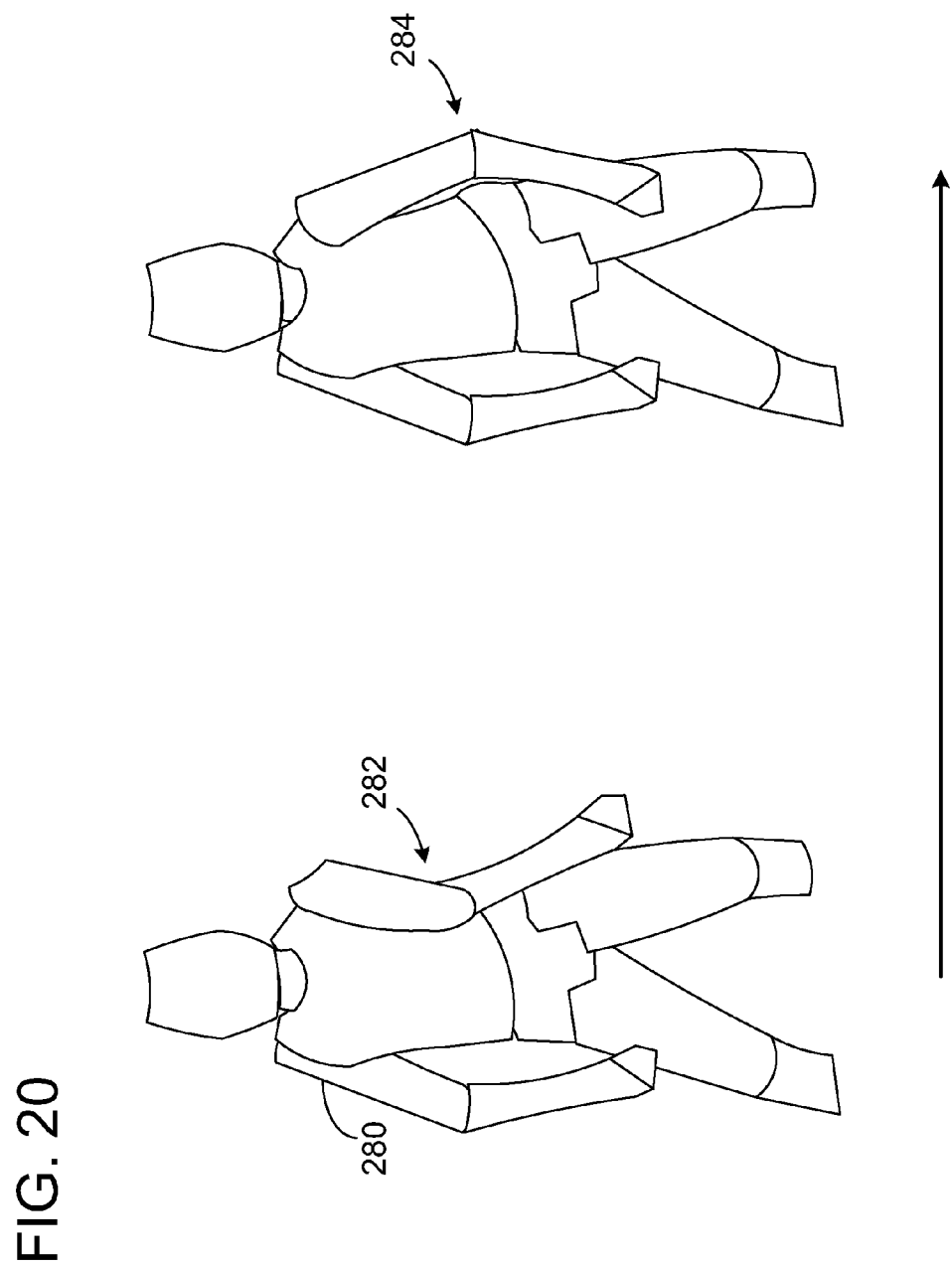
FIG. 20 illustrates another application of constraints to a model representing a target.

In regards to joint angle constraints, certain limbs and body parts may be limited in their range of motion relative to an adjacent body part. Additionally, this range of motion may change based on the orientation of adjacent body parts. Thus, applying joint angle constraints may allow limb segments to be constrained to possible configurations, given the orientation of parent limbs and/or body parts. For example, the lower leg can be configured to bend backwards (at the knee), but not forwards. If illegal angles are detected, the offending body part(s) and/or their parents (or, in the case of a mesh model, the offending triangles and their neighbors) are adjusted to keep the pose within a range of predetermined possibilities, thus helping avoid the case where the model collapses into a pose that is deemed to be unacceptable. FIG. 20 illustrates an example of a model 280 having one or more joint angle constraints applied to rectify an incorrect joint angle shown at 282, to be a within an acceptable range of motion such as shown at 284. In certain cases of extreme angle violations, the pose may be recognized as backwards, i.e., what is being tracked as the chest is really the player's back; the left hand is really the right hand; and so on. When such an impossible angle is clearly visible (and sufficiently egregious), this can be interpreted to mean that the pose has been mapped backwards onto the player's body, and the pose can be flipped to accurately model the target.

Collision tests may be applied to prevent the model from interpenetrating itself. For example, collision tests may prevent any part of the forearms/hands from penetrating the torso, or prevent the forearms/hands from penetrating each other. In other examples, collision tests may prevent a leg from penetrating the other leg. In some embodiments, collision tests may be applied to models of two or more players to prevent similar scenarios from occurring between models. It is to be understood that this can be accomplished through many different representations of the model geometry—e.g., polygonal hulls may be used for the core body, and parametric capsules (rounded cylinders, which may have different radii at opposing ends) for the limb segments. In some embodiments, collision tests may be applied to a body model and/or a skeletal model. In some embodiments, collision tests may be applied to certain polygons of a mesh model. As an example, FIG. 21 shows a model 290 wherein the hand and forearm of model 290 has interpenetrated the torso, as depicted at 292. Upon application of collision tests, such interpenetration can be detected and corrected, such as shown at 294.

Collision tests may be applied in any suitable manner. One approach examines collisions of one "volumetric line segment" vs. another, where a volumetric line segment may be a line segment with a radius that extends out in 3-D. An example of such a collision test may be examining a forearm vs. another forearm. In some embodiments, the volumetric line segment may have a different radius at each end of the segment.

Another approach examines collisions of a volumetric line segment vs. a posed polygonal object. An example of such a collision test may be examining a forearm vs. a torso. In some embodiments, the posed polygonal object may be a deformed polygonal object.

In some embodiments, knowledge that different portions of a target can move a limited distance in a time frame (e.g., $\frac{1}{30}^{th}$ or $\frac{1}{60}^{th}$ of a second) can be used as a constraint. Such a constraint may be used to rule out certain poses resulting from application of forces to pixel-receiving locations of the model.

As indicated at 145, after the model has been adjusted and optionally constrained, the process can loop back to begin a new rasterization of the model into a new synthesized depth image, which may then be compared to the observed depth image so that further adjustments can be made to the model. In this way, the model can be progressively adjusted to more closely represent the modeled target. Virtually any number of iterations can be completed each frame. More iterations may achieve more accurate results, but more iterations also may demand more computing overhead. It is believed that two or three iterations per frame is appropriate in many scenarios, although one iteration may be sufficient in some embodiments.

Figure 12B:
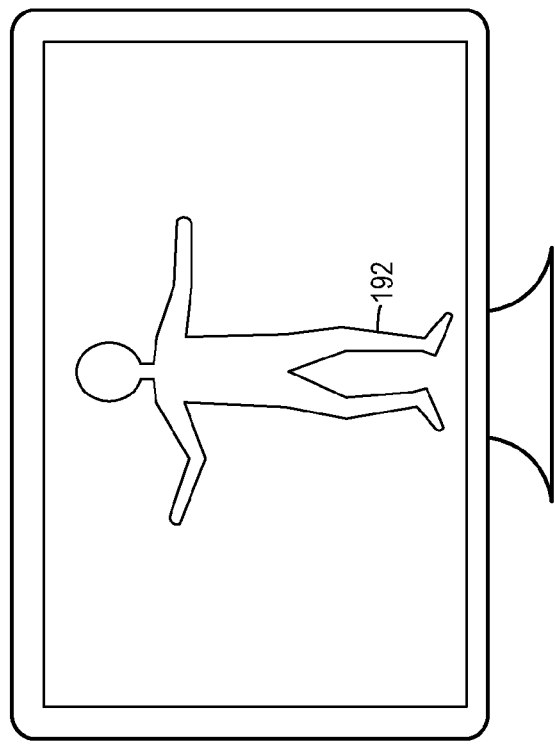
FIG. 12B shows a player avatar rendered from the model of FIG. 11B.
Figure 12A:
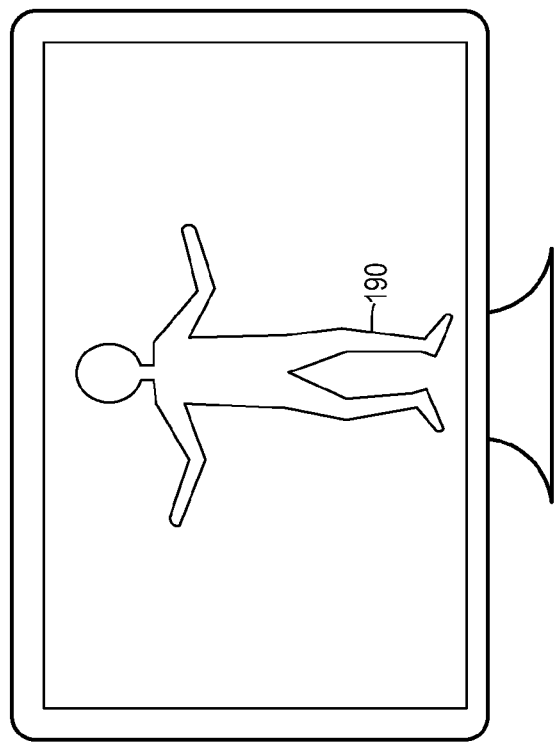
FIG. 12A shows a player avatar rendered from the model of FIG. 11A.

At 146, method 100 of FIG. 7 optionally includes changing the visual appearance of an on-screen character (e.g., player avatar 190 of FIG. 12A) responsive to changes to the model, such as changes shown in FIG. 11B. For example, a user playing an electronic game on a gaming console (e.g., gaming system 12 of FIGS. 1A and 1B) may be tracked by the gaming console as described herein. In particular, a body model (e.g., body model 70 of FIG. 3) including a skeletal model (e.g., skeletal model 180 of FIG. 11A) may be used to model the target game player, and the body model may be used to render an on-screen player avatar. As the game player straightens one arm, the gaming console may track this motion, then in response to the tracked motion, adjust the model 180 as depicted in FIG. 11B. The gaming console may also apply one or more constraints, as described above. Upon making such adjustments and applying such constraints, the gaming console may display the adjusted player avatar 192, as shown in FIG. 12B. This is also shown by way of example in FIG. 1A, in which player avatar 24 is shown punching boxing opponent 22 responsive to game player 18 throwing a punch in real space.

As discussed above, visual target recognition can be performed for purposes other than changing the visual appearance of an on-screen character or avatar. As such, the visual appearance of an on-screen character or avatar need not be changed in all embodiments. As discussed above, target tracking can be used for virtually limitless different purposes, many of which do not result in the changing of an on-screen character. The target tracking and/or the pose of the model, as adjusted, can be used as a parameter to affect virtually any element of an application, such as a game.

As indicated at 147, the above described process can be repeated for subsequent frames.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of tracking a human target, the method comprising:
  receiving an observed depth image of the human target from a source, the observed depth image including a plurality of observed pixels;
  obtaining a synthesized depth image of a model representing the human target, the synthesized depth image including a plurality of synthesized pixels;
  classifying a synthesized pixel of the plurality of synthesized pixels with a pixel case;
  computing a force vector for the synthesized pixel based on the pixel case of the synthesized pixel; and
  mapping the force vector to one or more force-receiving locations of the model representing the human target to adjust the model representing the human target into an adjusted pose.

2. The method of claim 1, where the synthesized depth image is obtained, at least in part, by rasterizing the model representing the human target.

3. The method of claim 1, where the synthesized pixel is classified with the pixel case based on at least a body-part index of the synthesized pixel.

4. The method of claim 3, where the synthesized pixel is classified with the pixel case, at least in part, based on a difference between an original body-part index of the synthesized pixel and a snap body-part index of the synthesized pixel or a grow body-part index of the synthesized pixel.

5. The method of claim 1, where the synthesized pixel is classified with the pixel case based on at least a player index of the synthesized pixel.

6. The method of claim 5, where the synthesized pixel is classified with the pixel case, at least in part, based on a difference between an original player index of the synthesized pixel and a snap player index of the synthesized pixel or a grow player index of the synthesized pixel.

7. The method of claim 1, where the synthesized pixel is classified with the pixel case based on at least a depth-value difference between the synthesized pixel and a corresponding observed pixel.

8. The method of claim 1, where the synthesized pixel has a pixel address, and where the synthesized pixel at the pixel address is classified with the pixel case based on one or more of an original player index, a snap player index, a grow player index, an original body-part index, a snap body-part index, a grow body-part index, an original synthesized depth value, a snap depth value, and an observed depth value for that pixel address.

9. The method of claim 1, where the pixel case is selected from a set of defined pixel cases including a refine-z pixel case, a magnetism pixel case, a push pixel case, a pull pixel case, a self-occluding push pixel case, and a self-occluding pull pixel case.

10. The method of claim 1, where the force vector mapped to the force-receiving location is one of a plurality of force vectors mapped to that force-receiving location, each such force vector corresponding to a synthesized pixel and classified pixel case, and each such force vector contributing to adjustment of the model representing the human target into an adjusted pose.

11. A method of tracking a target, the method comprising:
  representing the target with a model including a plurality of portions, each portion associated with a part index corresponding to a part of the target;
  classifying a portion of the model with a pixel case based on one or both of the part index associated with the portion of the model and a difference between a modeled position of the portion of the model and an observed position of a corresponding portion of the target; and
  adjusting the model in accordance with the pixel case of the portion of the model.

12. The method of claim 11, where the target is a human target and the part index is a body-part index corresponding to a part of the human target.

13. The method of claim 11, where each portion of the model includes one or more pixels, each pixel having a pixel address, an original body-part index, a snap body-part index, and a grow body-part index; and where the portion of the model is classified with the pixel case based on, for each of the one or more pixels, the original body-part index, the snap body-part index, the grow body-part index, and the difference between the modeled position of the portion of the model at that pixel address and the observed position of the corresponding portion of the target at that pixel address.

14. The method of claim 11, where the pixel case is selected from a set of defined pixel cases including a refine-z pixel case, a magnetism pixel case, a push pixel case, a pull pixel case, a null pixel case, a self-occluding push pixel case, and a self-occluding pull pixel case.

15. The method of claim 11, where the plurality of portions of the model correspond to a plurality of synthesized pixels of a synthesized depth image, and classifying the portion of the model with the pixel case includes classifying a synthesized pixel corresponding to that portion of the model.

16. A method of tracking a human target, the method comprising:
   receiving an observed depth image of the human target from a source, the observed depth image including a plurality of observed pixels;
   obtaining a synthesized depth image of a model representing the human target, the synthesized depth image including a plurality of synthesized pixels, each synthesized pixel including a body-part index corresponding to a body part of the human target;
   classifying a first synthesized pixel having a first body-part index corresponding to a first part of the human target with a first pixel case;
   classifying a second synthesized pixel having a second body-part index corresponding to a second part of the human target with a second pixel case;
   computing a first force vector for the first synthesized pixel in accordance with the first pixel case;
   computing a second force vector for the second synthesized pixel in accordance with the second pixel case;
   mapping the first force vector to a first force-receiving location of the model, the first force-receiving location corresponding to the first part of the human target; and
   mapping the second force vector to a second force-receiving location of the model, the second force-receiving location corresponding to the second part of the human target.

17. The method of claim 16, where the synthesized depth image is obtained by rasterizing the model representing the human target.

18. The method of claim 16, where the first pixel case is a magnetism pixel case and the second pixel case includes one or more of a refine-z pixel case, a push pixel case, a pull pixel case, a self-occluding push pixel case, and a self-occluding pull pixel case.

19. The method of claim 18, where the second synthesized pixel is classified with a pixel case based on a difference between the second synthesized pixel and a corresponding observed pixel.

20. The method of claim 18, where the second synthesized pixel is classified with a pixel case based on a difference between an original body-part index of the second synthesized pixel and a snap body-part index of the second synthesized pixel or a grow body-part index of the second synthesized pixel.

* * * * *